US012731336B2

(12) United States Patent
Wang et al.

(10) Patent No.: US 12,731,336 B2

(45) Date of Patent: Sep. 8, 2026

(54) THREE-DIMENSIONAL PHOTOMETRIC RECONSTRUCTION BASED AUTOMATED AIR-VOID SEGMENTATION SYSTEM FOR HARDENED CONCRETE

(71) Applicants: TEXAS STATE UNIVERSITY, San Marcos, TX (US); Yaxiong Huang, Austin, TX (US)

(72) Inventors: Feng Wang, Kyle, TX (US); Jueqiang Tao, San Marcos, TX (US); Haitao Gong, San Marcos, TX (US); Xiaohua Luo, Kyle, TX (US); Yaxiong Huang, Austin, TX (US)

(73) Assignee: Texas State University, San Marcos, TX (US)

( * ) Notice: Subject to any disclaimer, the term of this patent is extended or adjusted under 35 U.S.C. 154(b) by 263 days.

(21) Appl. No.: 18/209,788

(22) Filed: Jun. 14, 2023

(65) Prior Publication Data

US 2023/0401790 A1 Dec. 14, 2023

Related U.S. Application Data

(60) Provisional application No. 63/351,909, filed on Jun. 14, 2022.

(51) Int. Cl.

*G06T 17/10* (2006.01)
*G06T 7/00* (2017.01)
*G06V 10/141* (2022.01)

(52) U.S. Cl.

CPC ............ *G06T 17/10* (2013.01); *G06T 7/0004* (2013.01); *G06V 10/141* (2022.01); *G06T 2207/20081* (2013.01); *G06T 2207/20084* (2013.01)

(58) Field of Classification Search

CPC .................. G06T 17/10; G06T 7/0004; G06T 2207/20081; G06T 2207/20084;
(Continued)

(56) References Cited

U.S. PATENT DOCUMENTS

2016/0002108 A1* 1/2016 Chen .................... C04B 24/026 524/5
2021/0241478 A1* 8/2021 Putman .................... G06N 3/04
(Continued)

OTHER PUBLICATIONS

Pade, C., U. Jakobsen, and J. Elsen. A new automatic analysis system for analyzing the air void system in hardened concrete. In International cement microscopy association, 24th International Conference on Cement Microscopy, 2002. pp. 204-213.
(Continued)

*Primary Examiner* — Xiao M Wu
*Assistant Examiner* — Latrell Anthony Creary
(74) *Attorney, Agent, or Firm* — Farhang Amini; Shackelford, McKinley & Norton, LLP

(57) ABSTRACT

Embodiments of the present disclosure pertain to a computer-implemented method for automated identification of air voids on a surface by receiving a plurality of images of the surface; reconstructing the plurality of images into at least one three-dimensional representation of the surface; and feeding the reconstructed three-dimensional representation of the surface into an algorithm specifically trained for air void identification. Further embodiments of the present disclosure pertain to a computing device for automated identification of air voids on a surface in accordance with the method of the present disclosure. Additional embodiments of the present disclosure pertain to a system for automated identification of air voids on a surface.

24 Claims, 17 Drawing Sheets

(58) Field of Classification Search
CPC . G06T 2207/10016; G06T 2207/10024; G06T 2207/30132; G06T 7/586; G06V 10/141; G06V 10/60; G06V 10/82; G06V 20/64
See application file for complete search history.

(56) References Cited

U.S. PATENT DOCUMENTS

| | | | | |
|---|---|---|---|---|
| 2021/0264147 | A1* | 8/2021 | Kadambi | G06V 10/60 |
| 2024/0085186 | A1* | 3/2024 | Ringdahl | G01C 11/00 |
| 2024/0247930 | A1* | 7/2024 | Rohaly | G03B 35/02 |

OTHER PUBLICATIONS

Tao, J., Gong, H., Wang, F., Luo, X., Qiu, X., Huang, Y., 2021, Automated Image Segmentation of Air Voids in Hardened Concrete Surface Using Photometric Stereo Method, International Journal of Pavement Engineering. 2001811, 2021.

Woodham, R.J., 1980. Photometric method for determining surface orientation from multiple images. Optical engineering, 19 (1), 191139.

Ronneberger, O., Fischer, P., Brox, T., U-net: Convolutional networks for biomedical image segmentation, International Conference on Medical image computing and computer-assisted intervention, Springer, 2015, pp. 234-241.

ASTM, Standard Test Method for Microscopical Determination of Parameters of the Air-Void System in Hardened Concrete: C 457/C 457M-12, ASTM, 2012.

Baumgart, C., Blair, R. and Linder, K., 2006. Image analysis of hardened concrete: performance enhancement of the Automated Concrete Evaluation System (ACES) (No. OR 07-004). Missouri. Dept. of Transportation.

Carlson, J., Sutter, L., Van Dam, T. and Peterson, K.R., 2006. Comparison of flatbed scanner and RapidAir 457 system for determining air void system parameters of hardened concrete. Transportation research record, 1979(1), pp. 54-59.

Song, Y., Huang, Z., Shen, C., Shi, H. and Lange, D.A., 2020. Deep learning-based automated image segmentation for concrete petrographic analysis. Cement and Concrete Research, 135, p. 106118.

Wolter, S., Uhre, F.A.H., Hasholt, M.T., Dahl, V.A. and Anton, F., 2019. Air void analysis of hardened concrete by means of photogrammetry. Construction and Building Materials, 226, pp. 953-964.

Tao, J, et al. "Three-Dimensional Automated Segmentation of Air Voids in Hardened Concrete Using Photometric Stereo Method", was presented at the 100th TRB Annual Meeting in Washington DC on Jan. 14, 2021.

Tao, J., H. Gong, F. Wang, X. Luo, X. Qiu, and J. Liu. "Deep Learning Based Automated Segmentation of Air-Void System in Hardened Concrete Surface Using Three Dimensional Reconstructed Images". Construction and Building Materials, Construction and Building Materials, vol. 324, #126717, 2022.

Baumgart, C.; Cave, S.; Linder, K. Performance Enhancement of the Automated Concrete Evaluation System (ACES); Kansas City Plant, Kansas City, MO (US): 2002.

Lopez de Murphy, M.; Lissenden, C.; Xiao, C. Technology evaluation of characterization of the air void system in concrete; Pennsylvania. Dept. of Transportation: 2009.

Riding, K. A.; Albahttiti, M. Concrete Pavement Quality Control Testing Requirements Needed for the Super Air Meter; Kansas. Dept. of Transportation. Bureau of Research: 2016.

Saucier, F., R. Pleau, and D. Vezina. Precision of the air void characteristics measurement by ASTM C 457: results of an interlaboratory test program. Canadian Journal of Civil Engineering, vol. 23, No. 5, 1996, pp. 1118-1128.

Chatterji, S., and H. Gudmundsson. Characterization of entrained air bubble systems in concretes by means of an image analysing microscope. Cement concrete research, vol. 7, No. 4, 1977, pp. 423-428.

Aboufoul, M., A. Chiarelli, I. Triguero, and A. Garcia. Virtual asphalt to predict roads' air voids and hydraulic conductivity. Powder Technology, vol. 352, 2019, pp. 294-304.

Jakobsen, U. H., C. Pade, N. Thaulow, D. Brown, S. Sahu, O. Magnusson, S. De Buck, and G. De Schutter. Automated air void analysis of hardened concrete—a Round Robin study. Cement and Concrete Research, vol. 36, No. 8, 2006, pp. 1444-1452.

Peterson, K. W., R. A. Swartz, L. L. Sutter, and T. J. Van Dam. Hardened concrete air void analysis with a flatbed scanner. Transportation Research Record, vol. 1775, No. 1, 2001, pp. 36-43.

Peterson, K., J. Carlson, L. Sutter, and T. Van Dam. Methods for threshold optimization for images collected from contrast enhanced concrete surfaces for air-void system characterization. Materials Characterization, vol. 60, No. 7, 2009, pp. 710-715.

Peterson, K. W., G. C. Anzalone, S. Nezami, C. Y. S. Oh, and H. Lu. Robust test of the flatbed scanner for air-void characterization in hardened concrete. Journal of Testing Evaluation, vol. 44, No. 1, 2016, pp. 599-614.

Zalocha, D., and J. Kasperkiewicz. Estimation of the structure of air entrained concrete using a flatbed scanner. Cement concrete research, vol. 35, No. 10, 2005, pp. 2041-2046.

Song, Y., R. Zou, D. Castaneda, K. Riding, and D. Lange. Advances in measuring air-void parameters in hardened concrete using a flatbed scanner. Journal of Testing Evaluation, vol. 45, No. 5, 2017, pp. 1713-1725.

Song, Y., Z. Huang, C. Shen, H. Shi, and D. A. Lange. Deep learning-based automated image segmentation for concrete petrographic analysis. Cement and Concrete Research, vol. 135, 2020.

Lu, H., E. Alymov, S. Shah, and K. Peterson. Measurement of air void system in lightweight concrete by X-ray computed tomography. Construction Building Materials, vol. 152, 2017, pp. 467-483.

Boshoff, W. P. A Review of X-Ray Computed Tomography of Concrete and Asphalt Construction Materials. Construction Building Materials, vol. 199, 2019, pp. 637-651.

Du Plessis, A., B. J. Olawuyi, W. P. Boshoff, and S. G. Le Roux. Simple and fast porosity analysis of concrete using X-ray computed tomography. Materials structures, vol. 49, No. 1-2, 2016, pp. 553-562.

Lu, H., K. Peterson, and O. Chernoloz. Measurement of entrained air-void parameters in Portland cement concrete using micro X-ray computed tomography. International Journal of Pavement Engineering, vol. 19, No. 2, 2018, pp. 109-121.

Yun, T. S., K. Y. Kim, J. Choo, and D. H. Kang. Quantifying the distribution of paste-void spacing of hardened cement paste using X-ray computed tomography. Materials Characterization, vol. 73, 2012, pp. 137-143.

Bernardes, E. E., E. V. M. Carrasco, W. L. Vasconcelos, and A. G. de Magalhães. X-ray microtomography (μ-CT) to analyze the pore structure of a Portland cement composite based on the selection of different regions of interest. Construction Building Materials, vol. 95, 2015, pp. 703-709.

* cited by examiner

THREE-DIMENSIONAL PHOTOMETRIC RECONSTRUCTION BASED AUTOMATED AIR-VOID SEGMENTATION SYSTEM FOR HARDENED CONCRETE

CROSS-REFERENCE TO RELATED APPLICATIONS

The present application claims the benefit of U.S. Provisional Patent Application No. 63/351,909, filed on Jun. 14, 2022. The entirety of the aforementioned application is incorporated herein by reference.

BACKGROUND

Current systems and methods for segmenting air voids on a surface have numerous limitations. Embodiments of the present disclosure aim to address the aforementioned limitations.

SUMMARY

In some embodiments, the present disclosure pertains to a computer-implemented method for automated identification of air voids on a surface, such as a hardened concrete surface. In some embodiments, the method of the present disclosure includes: receiving a plurality of images of the surface; reconstructing the plurality of images into at least one three-dimensional representation of the surface; and feeding the reconstructed three-dimensional representation of the surface into an algorithm specifically trained for air void identification. Thereafter, the algorithm identifies the air voids on the surface. In some embodiments, the method of the present disclosure also includes a step of displaying the resulting air void identification. In some embodiments, the method of the present disclosure also includes a step of utilizing the identification results to assess the quality of the surface, such as the surface's freeze-thaw performance. In some embodiments, the method of the present disclosure also includes a step of utilizing the identification results to recommend and/or implement a surface treatment decision.

Additional embodiments of the present disclosure pertain to a computing device for automated identification of air voids on a surface. In some embodiments, the computing device includes one or more computer readable storage mediums having a program code embodied therewith. In some embodiments, the program code includes programming instructions for: receiving a plurality of images of the surface; reconstructing the received images into at least one three-dimensional representation of the surface; and feeding the reconstructed three-dimensional representation of the surface into an algorithm specifically trained for air void identification. In some embodiments, the algorithm identifies the air voids.

In some embodiments, the computing device further includes programming instructions for displaying the resulting air void identification. In some embodiments, the computing device further includes programming instructions for utilizing the identification results to assess the quality of the surface. In some embodiments, the computing device further includes programming instructions for recommending a surface treatment decision, implementing the surface treatment decision, or combinations thereof.

Additional embodiments of the present disclosure pertain to a system for automated identification of air voids on a surface. In some embodiments, the system includes a hardware system containing a camera operable to capture a plurality of images of the surface at different light directions, a plurality of lights operable to sequentially illuminate the surface at different light directions during the capture of the plurality of images, and a processor operable to reconstruct the received images into a three-dimensional representation of the surface.

The system of the present disclosure also includes a software system in electrical communication with the hardware system. The software system includes an algorithm specifically trained for air void identification. In some embodiments, the algorithm is operational to receive the reconstructed three-dimensional representation of the plurality of images from the hardware system to identify the air voids.

FIGURES

Figure 3A:
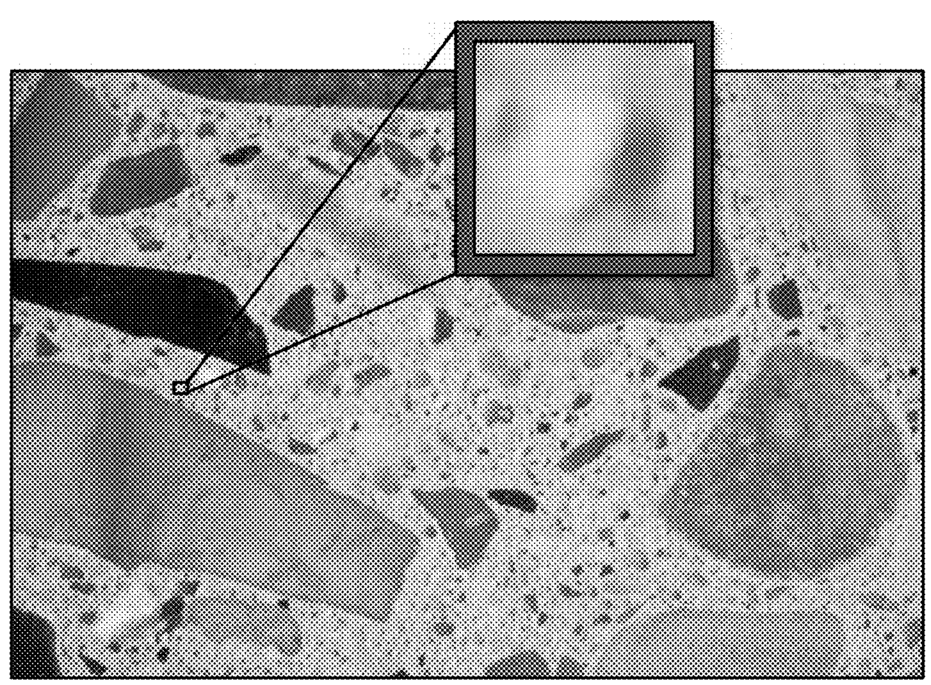
Figure 3B:
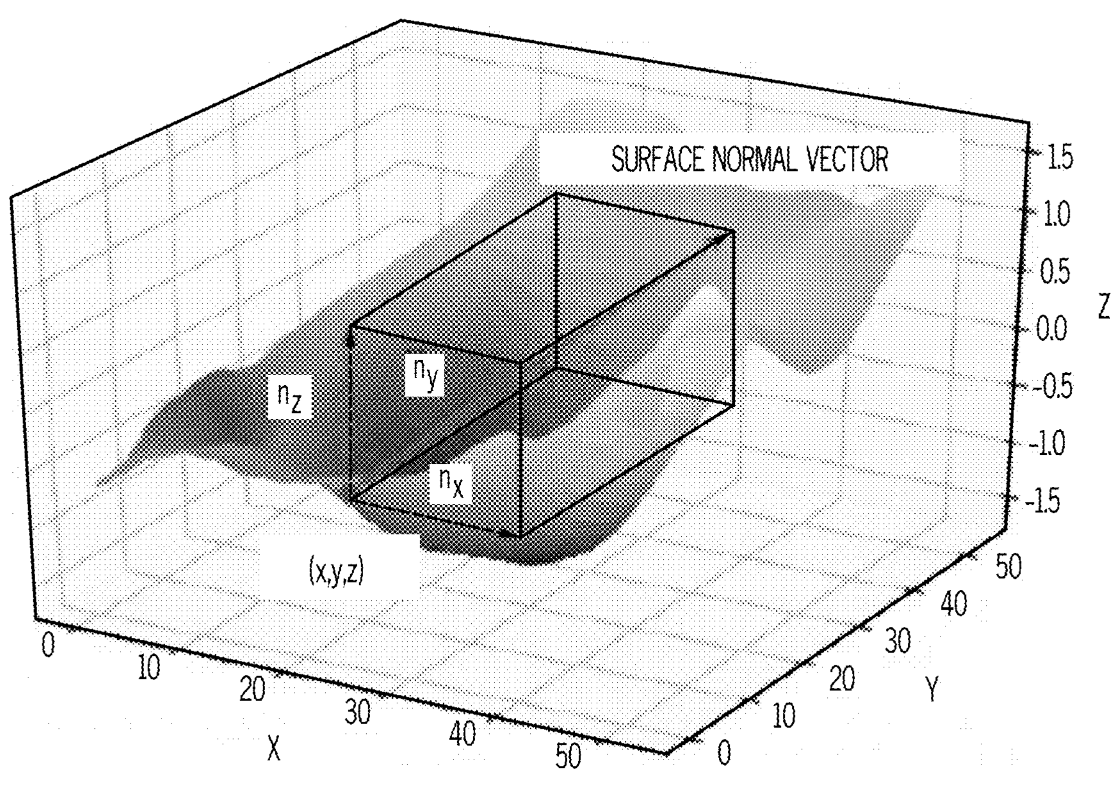

FIGS. 3A-3B provides an illustration of a surface normal vector on a concrete surface.

Figure 4:
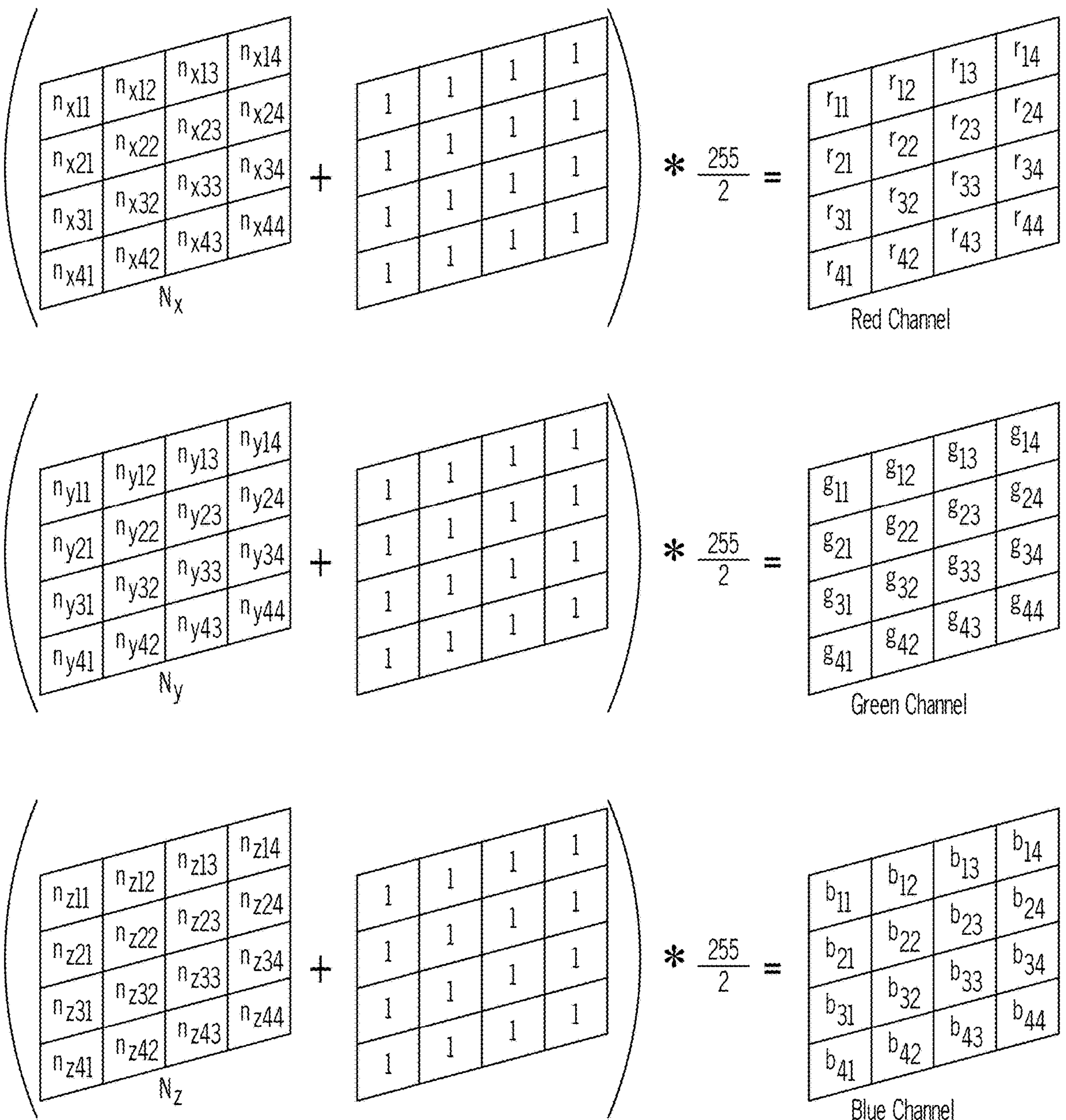

FIG. 4 provides an illustration of a mapping surface normal to red green blue (RGB) space.

Figure 5:
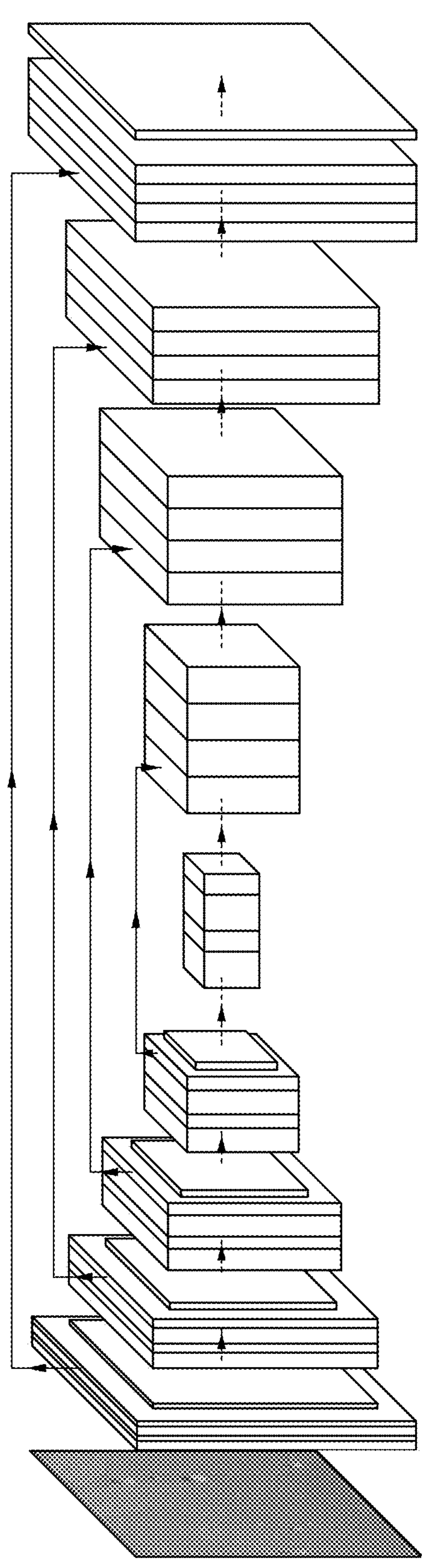
Figures 6A, 6B, 6C, 6D, 6E, 6F:
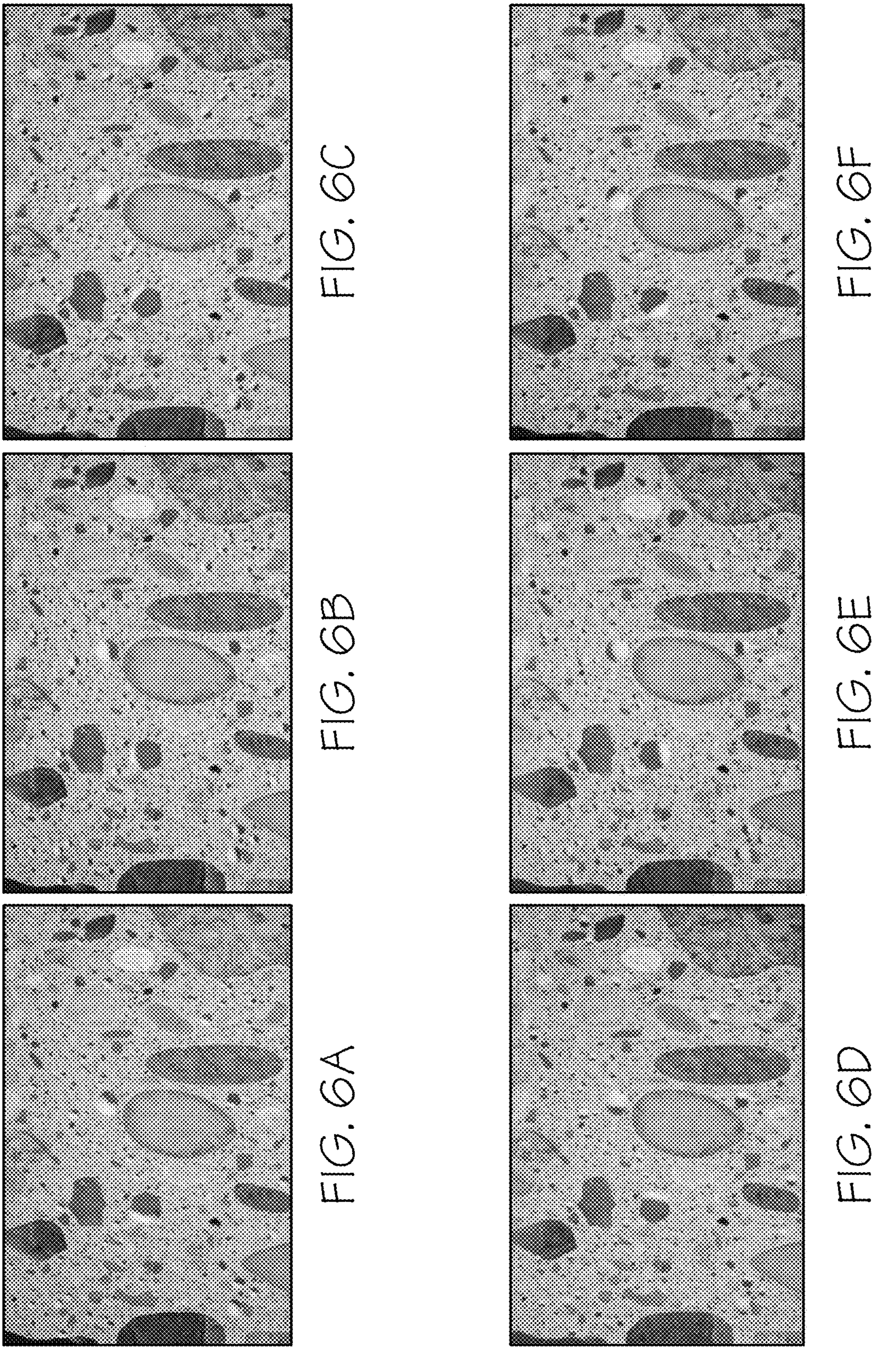

FIG. 5 provides an illustration of U-Net for image with resolution of 256 pixels×256 pixels.

FIGS. 6A-6F show images captured by a three-dimensional (3D) reconstruction hardware system under various illumination directions.

Figure 7B:
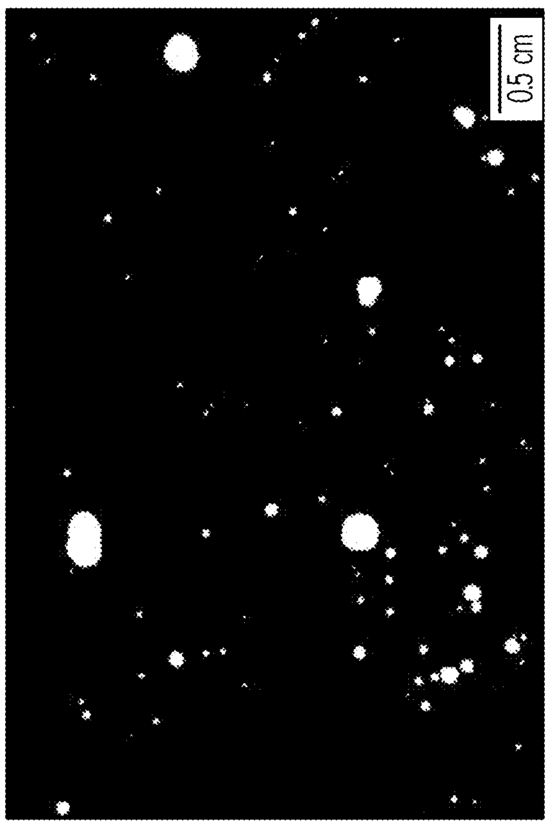
Figure 7B:
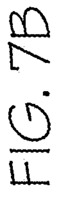
Figure 7A:
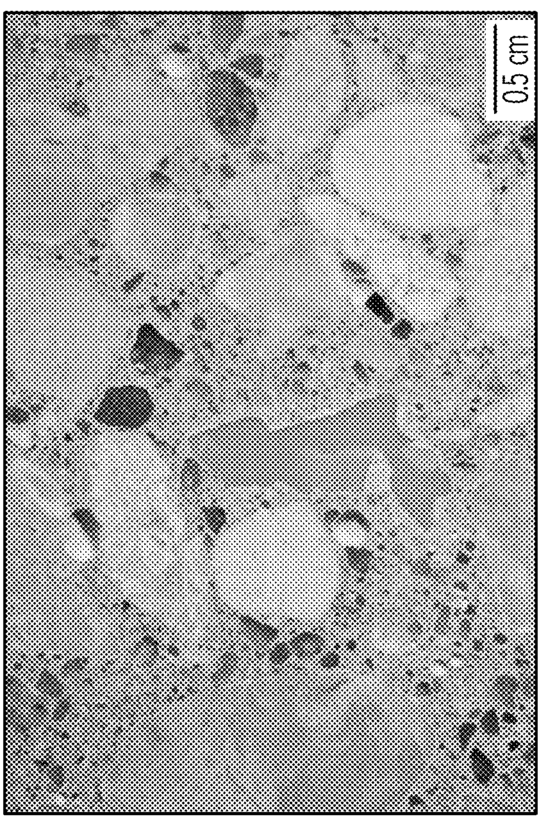

FIGS. 7A-7B provide an example of a manually annotated air-void image. FIG. 7A shows a hardened concrete surface. FIG. 7B shows annotated air voids.

Figure 8:
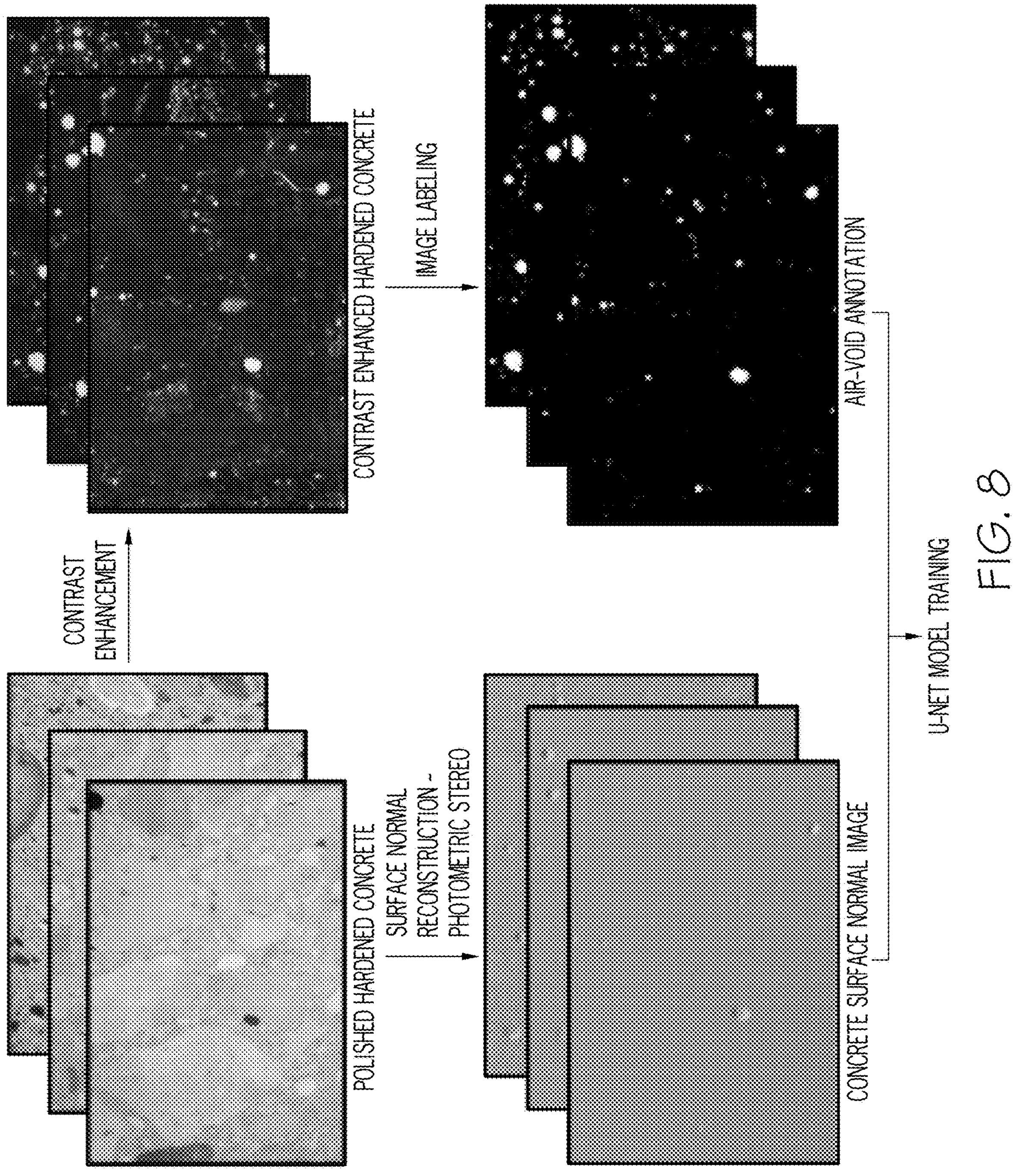

FIG. 8 illustrates a U-Net model training. The concrete surface normal images and air-void annotations were utilized for the training process.

Figure 9B:
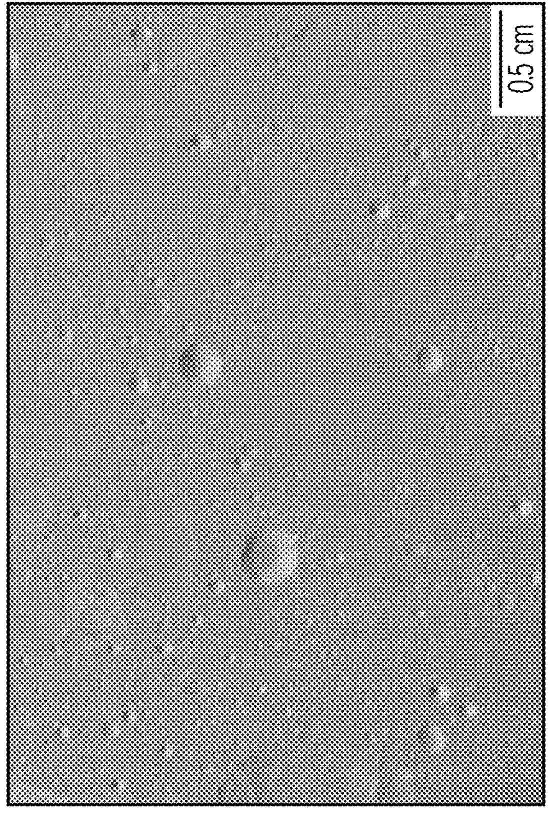
Figure 9A:
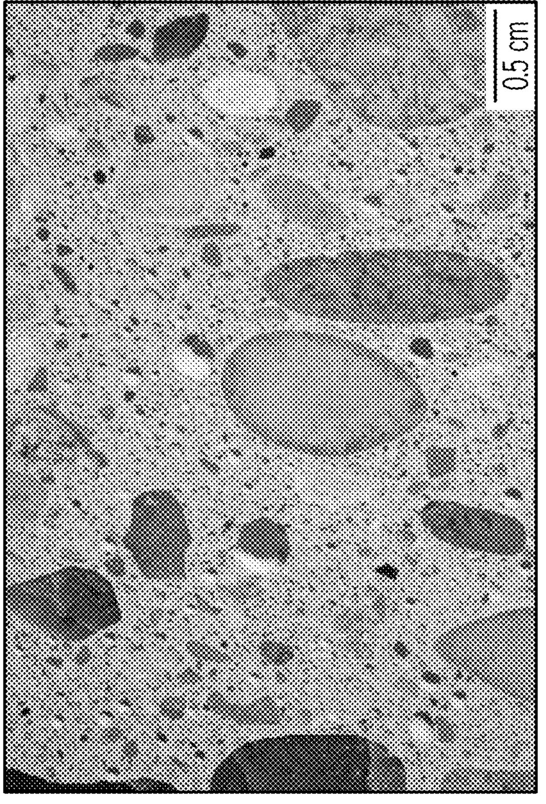

FIGS. 9A-9B show the air voids in original concrete surface image and surface normal image. FIG. 9A shows an original concrete surface image. FIG. 9B shows a mapped surface normal image.

Figure 10A:
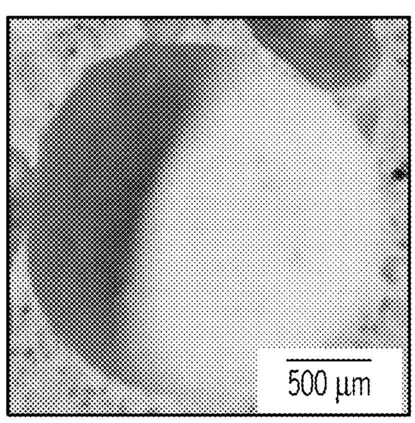
Figure 10A:
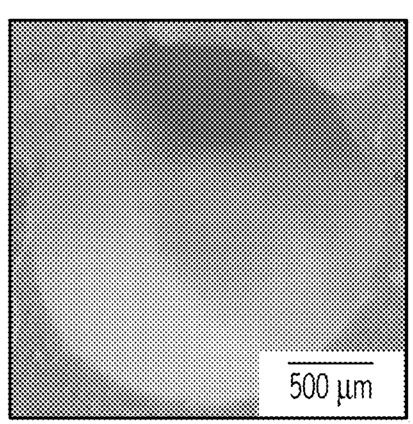
Figure 10B:
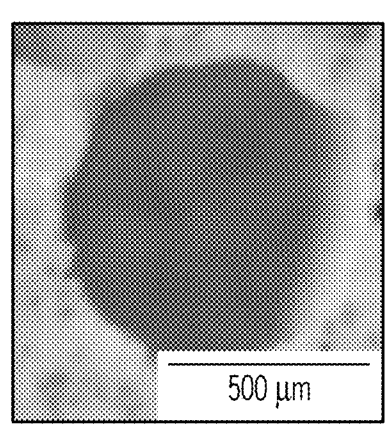
Figure 10B:
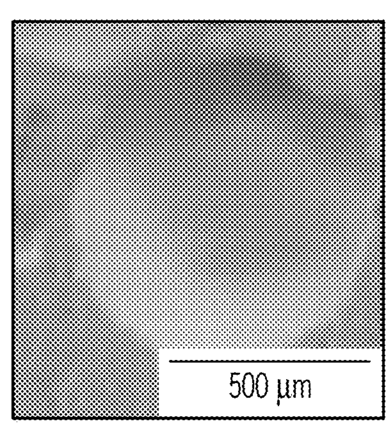
Figure 10C:
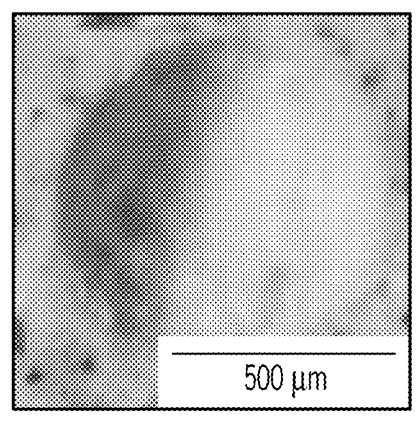
Figure 10C:
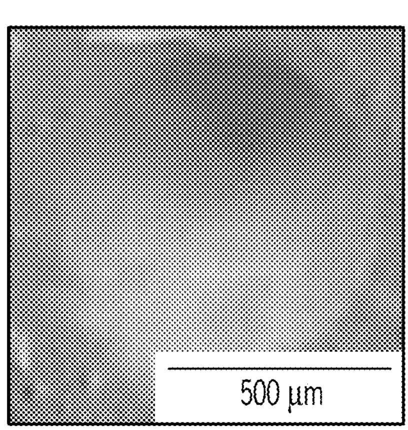
Figure 10D:
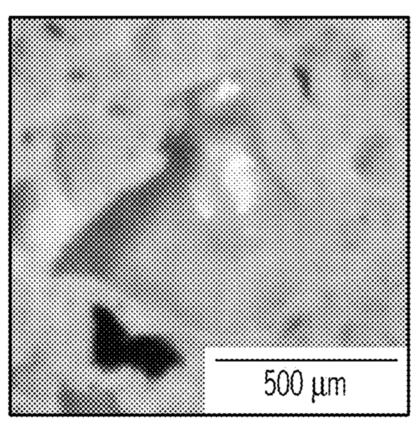
Figure 10D:
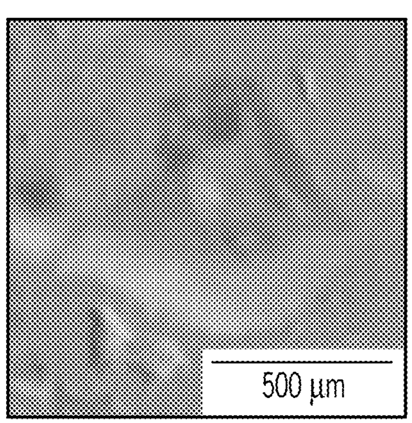
Figure 10E:
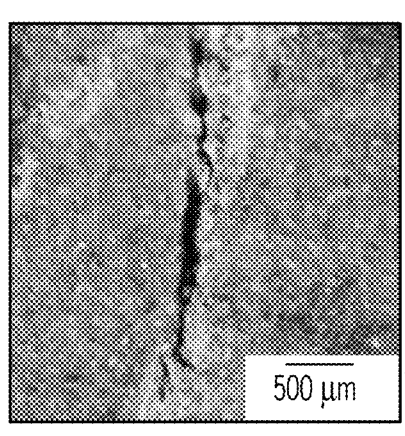
Figure 10E:
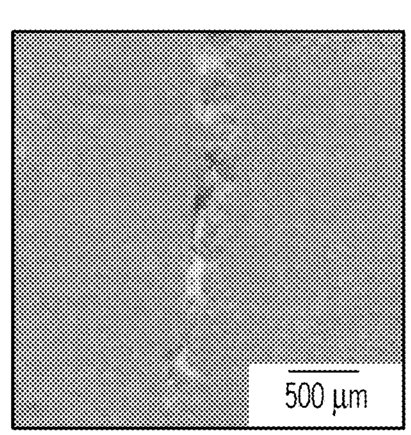
Figure 10F:
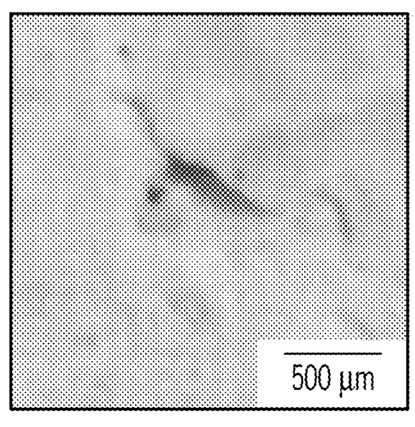
Figure 10F:
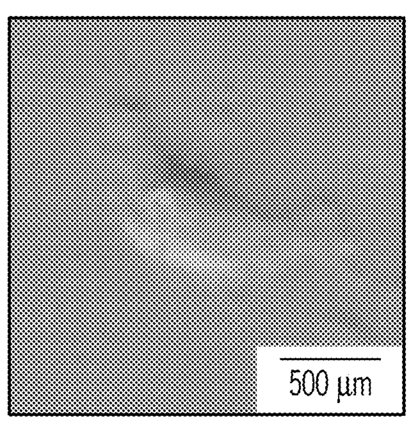
Figure 10G:
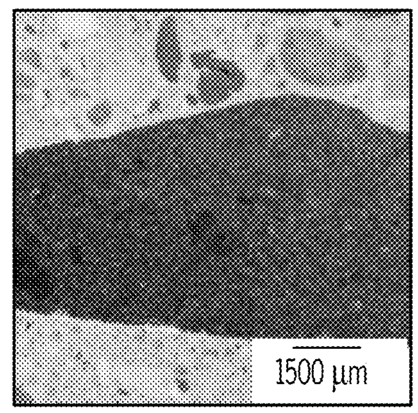
Figure 10G:
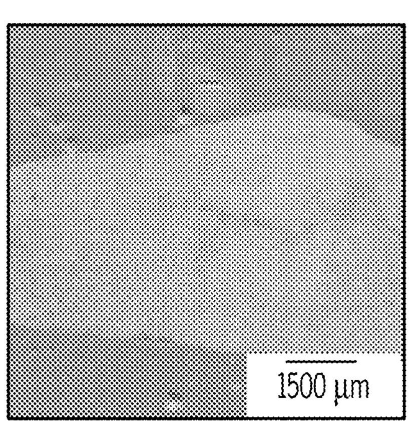

FIGS. 10A-10G show air-void appearances and air-void like noises generated by components on concrete surfaces. Shown are air void 1 (FIG. 10A), air void 2 (FIG. 10B), air void 3 (FIG. 10C), transparent aggregate (FIG. 10D), cracks in aggregate (FIG. 10E), void in aggregate (FIG. 10F), and dark aggregate (FIG. 10G).

Figures 11A, 11B:
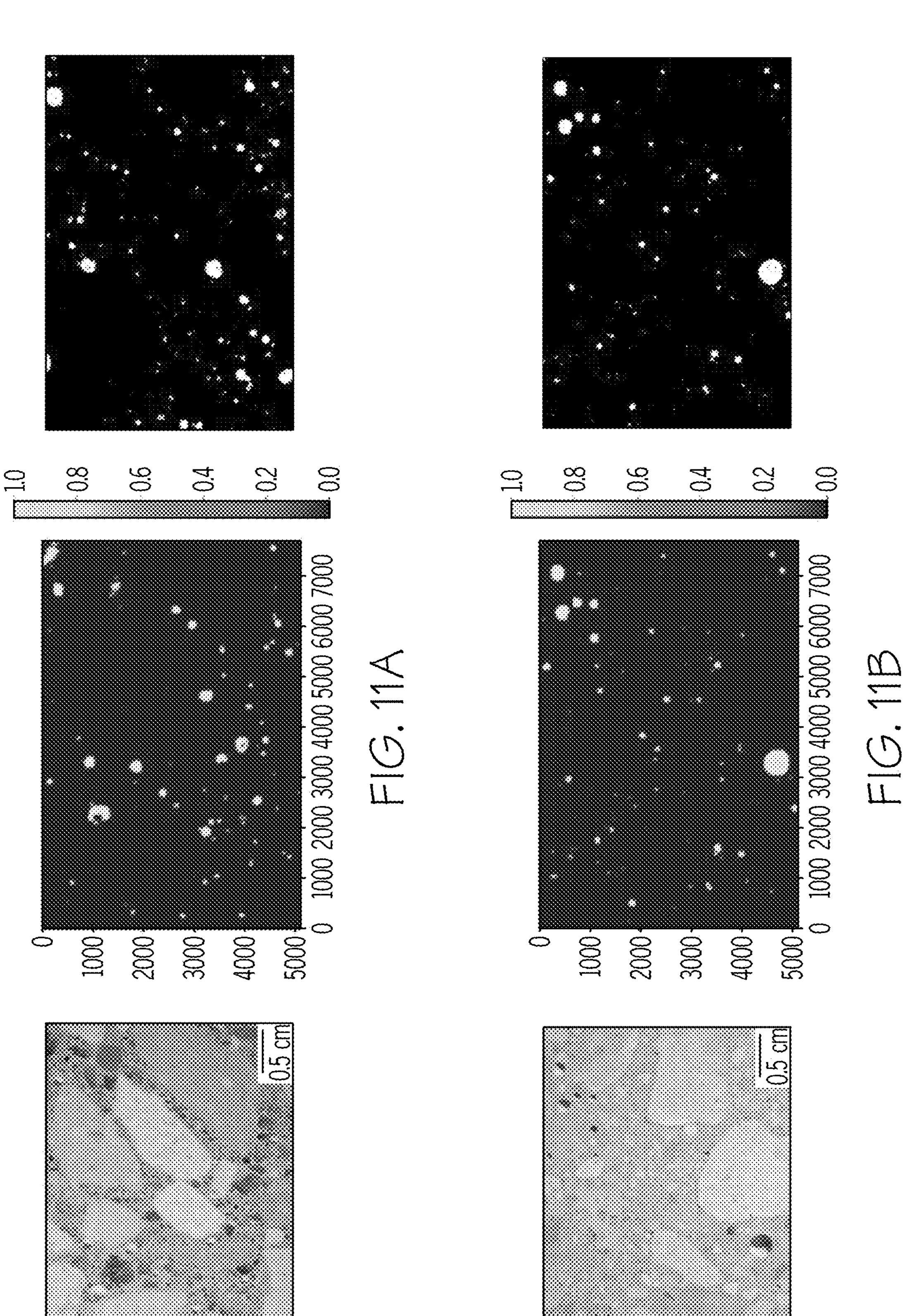
Figures 11C, 11D:
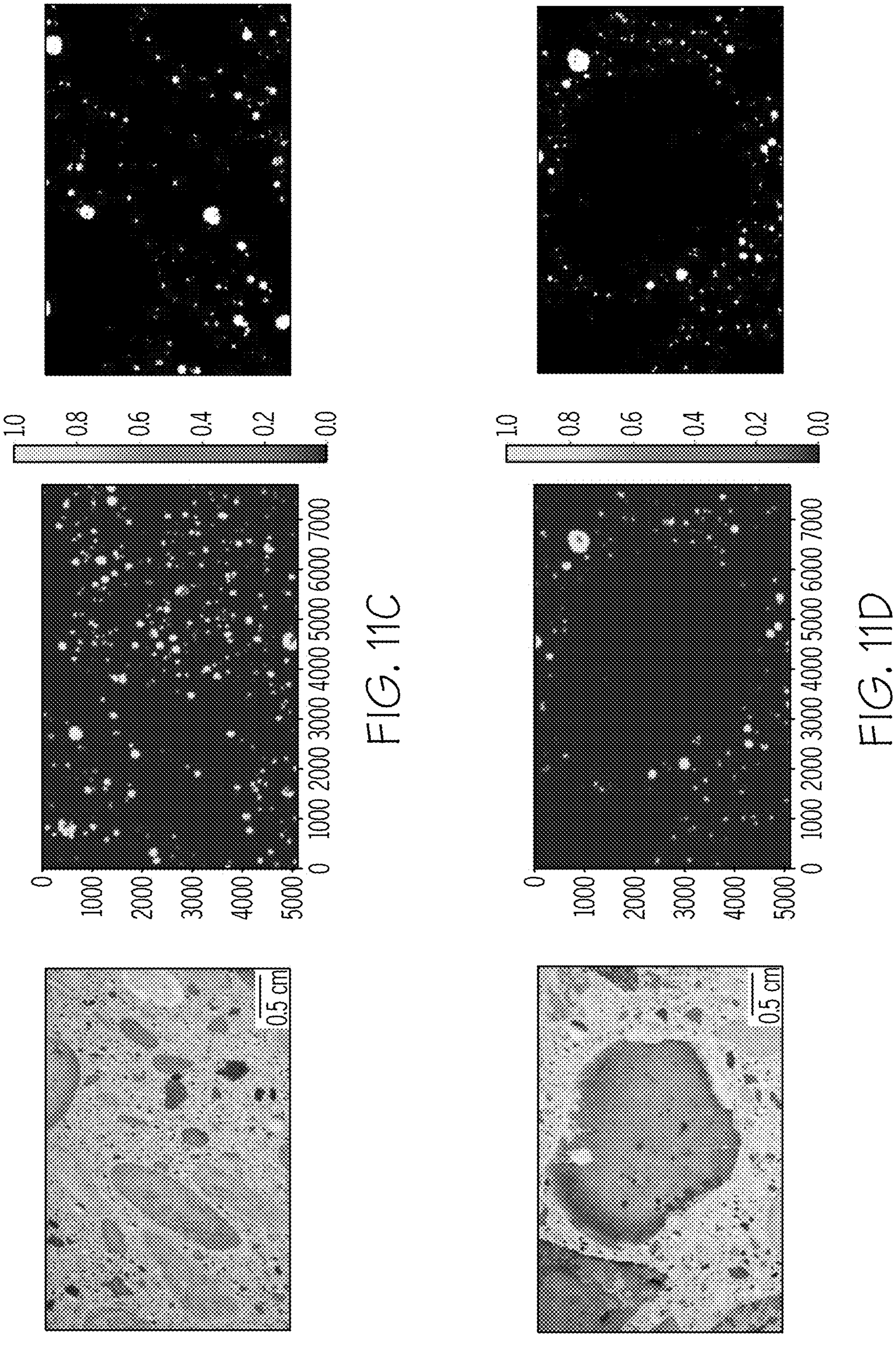
Figure 11E:
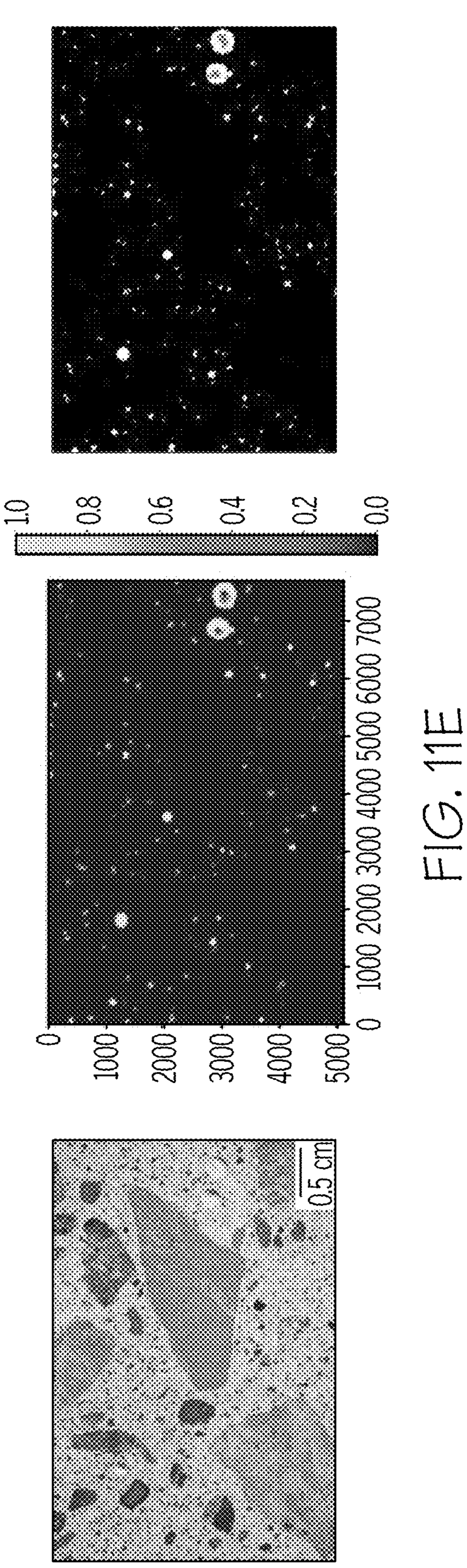

FIGS. 11A-11E show air-void segmentation results of test concrete samples using U-Net. Shown are sample 1 (FIG. 11A), sample 2 (FIG. 11B), sample 3 (FIG. 11C), sample 4 (FIG. 11D), and sample 5 (FIG. 11E).

DETAILED DESCRIPTION

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials define a term in a manner that contradicts the definition of that term in this application, this application controls.

Hardened concrete is composed of aggregates, cement paste and air voids. Well distributed air-void systems in hardened concrete are of high importance for maintaining concrete freeze-thaw performance. For instance, too many air voids may lead to lower concrete strength. On the other hand, too few air voids may lead to lower freeze-thaw performance.

According to ASTM C 457, air-void parameters are manually determined and evaluated by human operators who are pre-trained to identify air voids, cement paste, and aggregates. The judgments which are made by the pre-trained human operators are subjective and the results are operator-dependent, which makes the air-void measurement results subjective.

For instance, in a research study, 6 concrete specimens were examined by 18 experienced operators. Significant variations were found from one operator to another. In addition, manual examination of concrete surfaces is time-consuming and requires significant laboring hours.

To overcome the low efficiency and limitations of a subjective manual evaluation process, computer vision based automated air-void segmentation methods have been implemented. Charged-couple device (CCD) cameras and flatbed scanners are two main technologies utilized to capture two-dimensional (2D) concrete surface images. For instance, contrast enhancement steps that make concrete air voids appear white and the solid phase appear black have been proposed. In later studies, contrast enhancement methods were widely adopted for automated air-void system analysis with 2D digital images.

In another study, a flatbed scanner was used to collect polished concrete surfaces. The air voids, cement paste, and aggregates were well distinguished by manually increasing the contrast between the three phases. Non-stained images, phenolphthalein stained images and black & white treated images were the three kinds of images that were taken after each contrast enhancement process. The different Red, Green and Blue (RGB) channels of these captured images were combined to generate a contrast-enhanced image for image analysis. However, the air voids, cement paste, and aggregates were still segmented by thresholds, which were set manually.

Even though air voids and solid phase were in enhanced contrast, the grey levels of air voids and solid phase in 2D images can still vary under various lighting conditions. Several other automated thresholding strategies were then proposed for extraction of air voids.

For instance, a study proposed a systematic method to determine the optimum threshold for a flatbed scanner system. The air-void parameters calculated using consecutive thresholds between 0 and 255 were compared with the air-void parameters determined by human operators. The deviations between the automated results and manual results were obtained. Eventually, the threshold with a minimum deviation was selected as the optimum threshold.

The multi-spectral analysis is one of the most widely used methods for air-void thresholding. For instance, three RGB histograms were utilized to segment air voids and solid phase. Each histogram represented a different channel of an RGB image. The peaks of the 3 RGB histograms were considered as binarization thresholds for air voids, cement paste, and aggregates. In another research study, 20 images were scanned from 6 contrast-enhanced concrete specimens with a flatbed scanner. The spectral-spatial ECHO classifier algorithm which considered both spectral and spatial characteristics of air voids was utilized to automatically classify air voids and the solid phase in the concrete surface. The results showed a correlation between the measurement value and reference value.

Another study introduced deep learning techniques for concrete petrographic analysis. The research applied a convolutional neural networks (CNN) model to segment the paste and aggregates without contrast enhancement, which could achieve high segmentation accuracies. The segmentation result was robust to concrete samples with different types of aggregates and paste, and also outperformed the contrast enhancement based method. However, the contrast-enhancement process was still required to highlight the air voids from the paste.

Air voids are distributed in the three-dimensional (3D) space of hardened concrete and the 3D characteristics of air voids are useful information for distinguishing air voids from other features in a concrete surface image. Consequently, 3D technology could be a useful method to segment air voids in concrete specimens without contrast enhancement. Computed Tomography (CT) has therefore been employed for reliable measurement of air voids. The method not only provides alternative means of measurement, but it also presents a unique advantage with its capacity to capture the exact 3D location of all objects of interest and the air-void size distribution, and the derived air-void parameters that are not available to traditional 2D test methods. However, the air-void analysis of X-ray CT scanned images is also dependent on the thresholding strategies for the segmentation of air voids and solid phase in hardened concrete. Moreover, CT equipment is generally inaccessible in the field or near a field testing environment.

As such, a need exists for improved systems and methods for segmenting air voids on a surface. Numerous embodiments of the present disclosure aim to address the aforementioned need.

Method for Automated Identification of Air Voids on a Surface

Figure 1A:
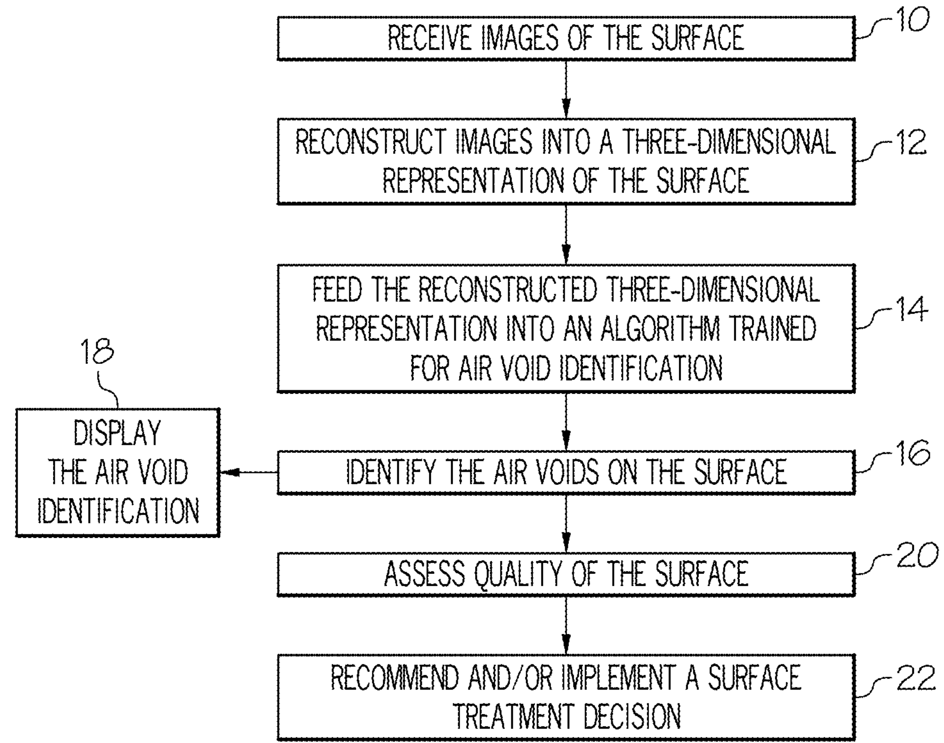
FIG. 1A illustrates a computer-implemented method for automated identification of air voids on a surface.

In some embodiments, the present disclosure pertains to a computer-implemented method for automated identification of air voids on a surface. In some embodiments illustrated in FIG. 1A, the method of the present disclosure includes: receiving a plurality of images of the surface (step 10); reconstructing the plurality of images into at least one three-dimensional representation of the surface (step 12); and feeding the reconstructed three-dimensional representation of the surface into an algorithm specifically trained for air void identification (step 14). Thereafter, the algorithm identifies the air voids on the surface (step 16). In some embodiments, the method of the present disclosure also includes a step of displaying the resulting air void identification (step 18). In some embodiments, the method of the present disclosure also includes a step of utilizing the identification results to assess the quality of the surface (step 20). In some embodiments, the method of the present disclosure also includes a step of utilizing the identification results to recommend and/or implement a surface treatment decision (step 22). As set forth herein, the method of the present disclosure can have numerous embodiments.

Air Void Identification on Surfaces

Air voids generally refer to empty spaces or pockets on or within a surface that are filled with air. For instance, air voids in hardened concrete can be categorized as entrained air and entrapped air. The entrained air voids serve the most important function of providing the concrete with a better freeze-thaw resistance, while the entrapped air voids are larger and not well distributed and therefore of less value for freeze-thaw protection. The air bubbles can store the water fed from the surrounding capillary pores that are connected to them when the surrounding paste is frozen. Ice formation primarily takes place in the air voids so that the buildup of internal pressure due to the freeze-thaw effect can be released or eliminated.

The method of the present disclosure may be utilized to identify air voids on various surfaces. For instance, in some embodiments, the surface includes a concrete surface. In some embodiments, the surface includes a hardened concrete surface. In some embodiments, the concrete surface includes hardened cement. In some embodiments, the concrete surface includes a component that includes, without limitation, limestone, quartz, chert, granite, feldspar, sand, sandstone, igneous derivatives thereof, siliceous derivatives thereof, or combinations thereof.

In some embodiments, the surface includes an asphalt surface. In some embodiments, the surface includes the surface of an iron carbonate layer. In some embodiments, the surface includes a porousness aggregate surface.

In some embodiments, air void identification occurs without modifying the contrast of a surface. In some embodiments, air void identification occurs without modifying the contrasts of the plurality of images of the surface. For instance, in some embodiments, the air void identification method of the present disclosure occurs without modifying the contrast of a surface through methods that include, without limitation, blackening of the surface, whitening the air voids in the surface, eliminating non-air-void defects, or combinations thereof.

In some embodiments, air void identification includes segmenting the air voids. In some embodiments, air void identification includes segmenting air voids, cement paste, and/or aggregates. In some embodiments, the segmenting of the air voids includes segmenting the air voids based on air void color, air void shade, air void depth, or combinations thereof. In some embodiments, air void identification includes counting the number of air voids, measuring the chord length of air voids, or combinations thereof. In some embodiments, surface contrast enhancement may be required prior to air void segmentation.

Surface Images

The method of the present disclosure may receive various surface images. For instance, in some embodiments, the plurality of images include at least three images of the surface. In some embodiments, each of the plurality of images are captured under different lighting directions. In some embodiments, each of the plurality of images are captured under a fixed field of view.

In some embodiments, the method of the present disclosure also includes a step of capturing the plurality of images. In some embodiments, the capturing of each of the plurality of images occurs at different light directions.

In some embodiments, the capturing of the plurality of images occurs through the utilization of a camera. In some embodiments, the camera is operable to capture a plurality of images of a surface at different light directions through a plurality of lights that are operable to sequentially illuminate the surface at different light directions during the capture of the plurality of images.

Figure 2A:
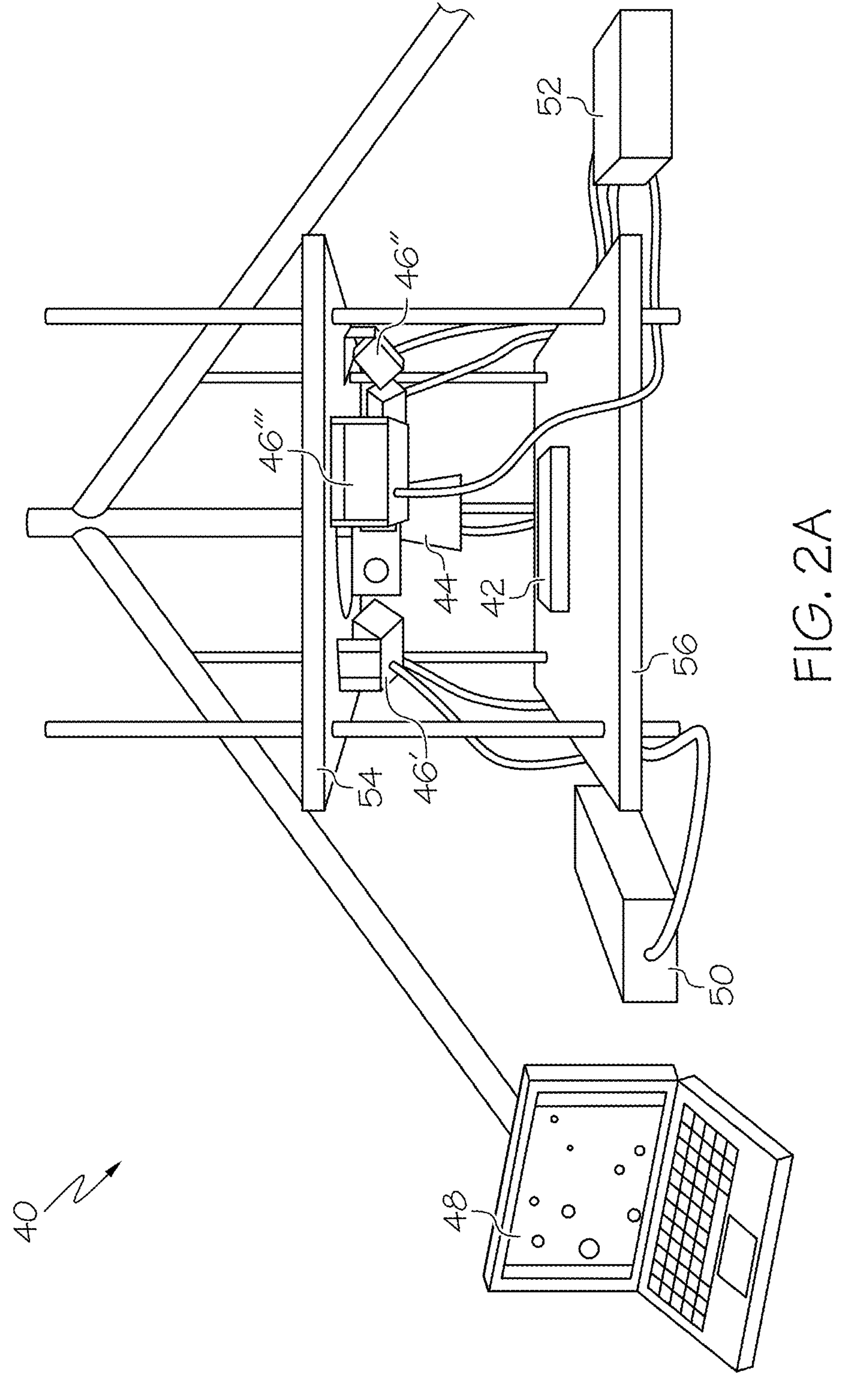
FIGS. 2A-2B illustrate a system for automated identification of air voids on a surface.
Figure 2B:
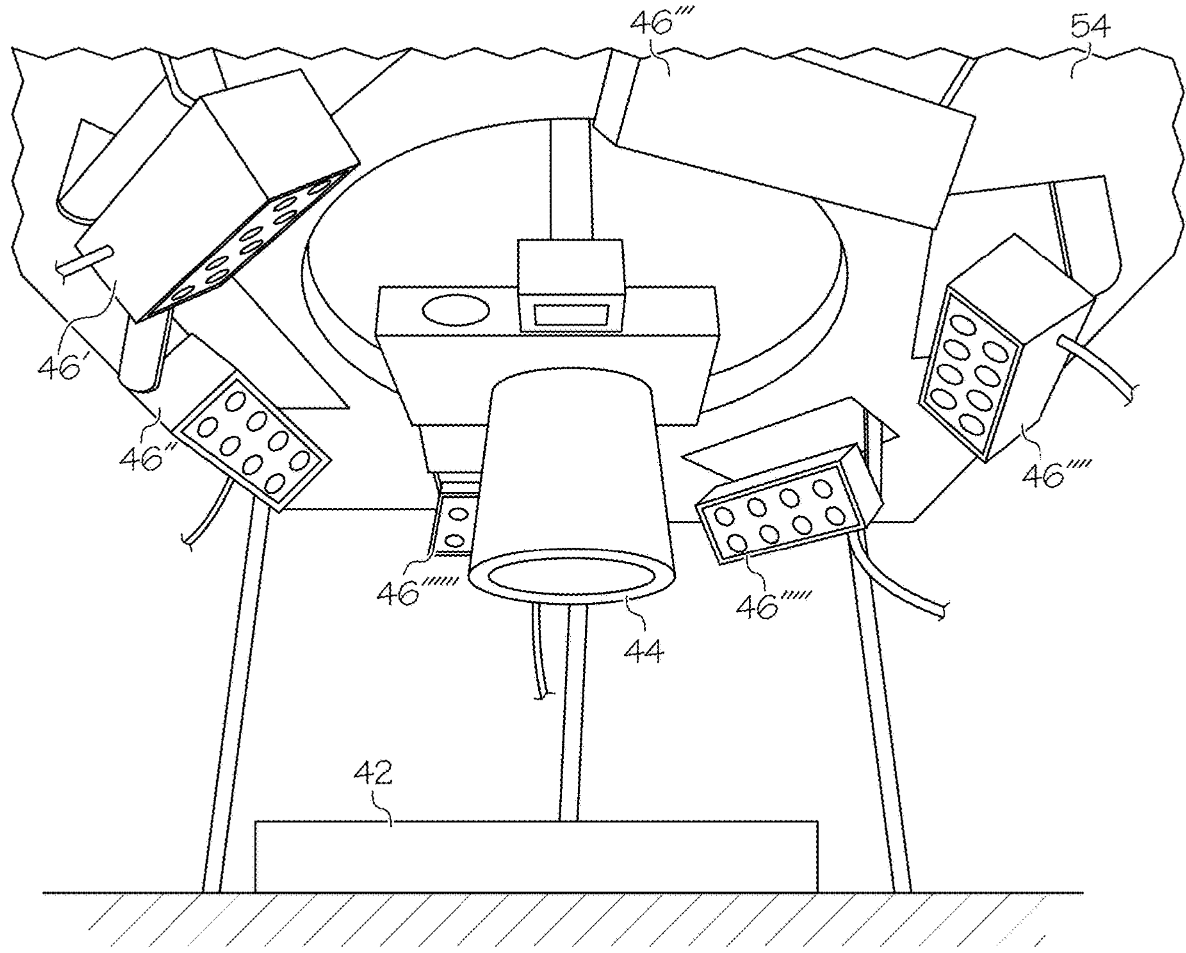

For instance, in some embodiments illustrated in FIGS. 2A-2B, a camera 44 may be a component of a system 40 for automated identification of air voids on a surface 42. Camera 44 in this example is operable to capture a plurality of images of surface 42 at different light directions through a plurality of lights 46 that are operable to sequentially illuminate surface 42 at different light directions during the capture of the plurality of images.

In some embodiments, the camera includes a high-resolution charge coupled device (CCD) camera. In some embodiments, the plurality of lights include light emitting diodes (LEDs).

Reconstructed Three-Dimensional Representation of Surfaces

The present disclosure may utilize various methods to reconstruct surface images into a three-dimensional representation of the surface. For instance, in some embodiments, the reconstructing of the images occurs by three-dimensional photometric reconstruction. In some embodiments, the three-dimensional photometric reconstruction estimates the three-dimensional representation of the surface as a function of a relationship between intensity of the plurality of images and surface normal of the surface. In some embodiments, the three-dimensional photometric reconstruction includes surface normal reconstruction of the surface to generate a surface normal map of the surface. In some embodiments, the three-dimensional photometric reconstruction includes additional surface normal integration to generate a depth map of the surface.

Additional embodiments of three-dimensional photometric reconstruction are described in more detail in Example 1.2. Generally, the state-of-the-art three-dimensional (3D) reconstruction approaches can be classified as passive and active methods. Passive 3D imaging approaches reconstruct the 3D surface of an object without introducing new energy (e.g., light) into the environment. Numerous technologies and methods are employing this approach, including multi-view stereo, structure from motion, light-field (plenoptic) cameras, and space-carving techniques. Active 3D imaging approaches introduce outside energy sources to help 3D reconstruction and overcome many problems of the passive approaches such as the time-of-flight method and triangulation method. Both of the time-of-flight method and the triangulation method adopt laser scanners to capture the depth information. The method of the present disclosure can utilize both passive and active 3D reconstruction methods to reconstruct surface images into a three-dimensional representation of the surface.

The reconstructed three-dimensional representations of a surface may include various surface details. For instance, in some embodiments, the reconstructed three-dimensional representation includes three-dimensional representations of air voids on a surface. In some embodiments, the reconstructed three-dimensional representation includes three-dimensional representations of hardened cement paste and aggregates on a surface. In some embodiments, the reconstructed three-dimensional representation includes three-dimensional representations of fly ash on a surface.

The method of the present disclosure may utilize various systems to reconstruct surface images into a three-dimensional representation of the surface. For instance, in some embodiments, the reconstructing of the images occurs through the use of a hardware system. In some embodiments, the hardware system includes a camera operable to capture the plurality of images of the surface at different light directions, a plurality of lights operable to sequentially illuminate the surface at different light directions during image capture, and a processor operable to reconstruct the received images into the three-dimensional representation.

In some embodiments, the algorithm for air void identification is in electrical communication with the hardware system. In some embodiments, the algorithm receives the reconstructed three-dimensional representation of the surface from the hardware system. In some embodiments, the algorithm is stored in a data collection and data processing software system.

For instance, in some embodiments illustrated in FIGS. 2A-2B, a hardware system is part of system 40 for automated identification of air voids on a surface 42. System 40 generally includes a hardware system that includes: a camera 44 operable to capture a plurality of images of surface 42 at different light directions, a plurality of lights 46 operable to sequentially illuminate surface 42 at different light directions during the capture of the plurality of images, and a processor operable to reconstruct the received images into a three-dimensional representation of surface 42.

Algorithms

The method of the present disclosure may utilize various types of algorithms for air void identification on the surface. For instance, in some embodiments, the algorithm includes a machine-learning algorithm. In some embodiments, the machine-learning algorithm is trained to distinguish between air voids and non-air voids on a surface.

In some embodiments, the machine-learning algorithm is an Li-regularized logistic regression algorithm. In some embodiments, the machine-learning algorithm includes supervised learning algorithms. In some embodiments, the supervised learning algorithms include nearest neighbor algorithms, naïve-Bayes algorithms, decision tree algorithms, linear regression algorithms, support vector machines, neural networks, convolutional neural networks, ensembles (e.g., random forests and gradient boosted decision trees), and combinations thereof. In some embodiments, the machine-learning algorithm is a Convolutional Neural Network (CNN) algorithm. In some embodiments, according to the final output of the machine-learning algorithms, the CNN can be subdivided into image segmentation algorithms and object detection algorithms. In some embodiments, the image segmentation CNN algorithms include Unet model, Unet+ model, Unet++ model, DeepLab model series, or combinations thereof. In some embodiments, the object detection CNN algorithms include Faster Region-based CNN (R-CNN), Mask R-CNN, RatinaNet model, YOLO model series, or combinations thereof.

Machine-learning algorithms may be trained to identify air voids on a surface in various manners. For instance, in some embodiments, the training includes: (1) feeding training and validation datasets, which include air void images and air void annotations (a binary image with 0 and 1, where 0 indicates background and 1 indicates air voids), into a machine-learning algorithm; (2) the machine-learning algorithm uses air void images in training dataset as inputs and output air void identification results via binary images where 0 indicates background and 1 indicates air voids; (3) according to the comparison results of the model outputs and air void annotations in training dataset, the model update its weights and bias within the machine-learning algorithm; and (4) the model adopting the air void images and air void annotations in the validation dataset to ensure the model is not overfitting.

In some embodiments, the machine-learning algorithm is associated with a graphical user interface (GUI) that is operational for training the machine-learning algorithm to identify air voids of a surface. In some embodiments, the algorithm identifies the air voids of a surface in a quantitative manner.

In some embodiments, a model (e.g., a machine-learning model) is built and trained to identify air voids on a surface. In some embodiments, a machine learning algorithm (e.g., a supervised learning algorithm) is utilized to build the model to identify air voids of a surface using a sample data set containing historical information as to air voids on surfaces, where such historical information may be provided by an expert. Such a sample data set is referred to herein as the "training data," which is used by the machine-learning algorithm to make predictions to the identification of air voids. The machine-learning algorithm iteratively makes predictions on the training data as to the identification of the air voids until the predictions achieve the desired accuracy as determined by an expert. Examples of such machine-learning algorithms include nearest neighbor, Naïve Bayes, decision trees, linear regression, support vector machines and neural networks.

In some embodiments, air void-related data and the associated identifications of the air voids are stored in a data structure (e.g., a table). For instance, in some embodiments, the data structure may include a listing of one or more air void-related data that are associated with various air voids. In some embodiments, such a data structure is populated by an expert. In some embodiments, such a data structure is stored in a storage device, such as memory 35 of system 30 in FIG. 1B.

Display of Identification Results

In some embodiments, the method of the present disclosure also includes a step of displaying resulting air void identifications. For instance, in some embodiments, the identified air voids are displayed on a graphical user interface.

Applications

The method of the present disclosure can have numerous applications. For instance, in some embodiments, the method of the present disclosure also includes a step of utilizing the identification results to assess the quality of the surface. In some embodiments, the assessed quality of the surface includes the free-thaw performance of the surface. In some embodiments, the assessed quality of the surface includes the freeze-thaw performance of a hardened concrete surface based on the ASTM C457 standard. In some embodiments, >6±1 percent air, specific surface>24 $mm^2/mm^3$, and spacing factor<0.20 mm indicates an adequate freeze-thaw performance and surface strength.

In some embodiments, the freeze-thaw performance test can be used for hardened concrete specimen made with a concrete mix-design to test the reliability of the concrete mix-design. In some embodiments, the freeze-thaw performance test can also be used for hardened concrete specimen, which is drilled from an in-service concrete structure, to test the reliability of the in-service concrete structure.

In some embodiments, the method of the present disclosure also includes a step of utilizing the identification results to recommend a surface treatment decision. In some embodiments, the method of the present disclosure includes a step of utilizing the identification results to implement a surface treatment decision.

Computing Devices for Automated Identification of Air Voids

Additional embodiments of the present disclosure pertain to a computing device for automated identification of air voids on a surface. In some embodiments, the computing device includes one or more computer readable storage mediums having a program code embodied therewith. In some embodiments, the program code includes programming instructions for: receiving a plurality of images of the surface; reconstructing the received images into at least one three-dimensional representation of the surface; and feeding the reconstructed three-dimensional representation of the surface into an algorithm specifically trained for air void identification. In some embodiments, the algorithm identifies the air voids.

In some embodiments, the programing instructions for reconstructing of the images includes programing instructions for three-dimensional photometric reconstruction. In some embodiments, the computing device further includes programming instructions for displaying the resulting air void identification. In some embodiments, the computing device further includes programming instructions for utilizing the identification results to assess the quality of the surface. In some embodiments, the computing device further includes programming instructions for recommending a surface treatment decision, implementing the surface treatment decision, or combinations thereof.

In some embodiments, the computing device is in electrical communication with a hardware system operable to reconstruct an image (e.g., a hardware system of system 40 illustrated in FIGS. 2A-2B). In some embodiments, the hardware system includes: a camera operable to capture the plurality of images of the surface at different light directions (e.g., camera 44 illustrated in FIGS. 2A-2B), a plurality of lights operable to sequentially illuminate the surface at different light directions during the capture of the plurality of images (e.g., lights 46 illustrated in FIGS. 2A-2B), and a processor operable to reconstruct the received images into the three-dimensional representation. In some embodiments, the computing device further includes programming instructions for capturing the plurality of images.

In some embodiments, the algorithm is in electrical communication with the hardware system. In some embodiments, the algorithm receives the reconstructed three-dimensional representation of the surface from the hardware system. In some embodiments, the algorithm is stored in a data collection and data processing software system.

In some embodiments, the algorithm is a machine learning algorithm. In some embodiments, the machine learning algorithm is trained to distinguish between air voids and non-air voids on the surface. Suitable machine learning algorithms were described supra and are incorporated herein by reference. For instance, in some embodiments, the machine learning algorithm includes Convolutional Neural Network (CNN) algorithms. In some embodiments, according to the final output of the machine-learning algorithms, the CNN can be subdivided into image segmentation algorithms and object detection algorithms. In some embodiments, the image segmentation CNN algorithms include Unet model, Unet+ model, Unet++ model, DeepLab model series, or combinations thereof. In some embodiments, the object detection CNN algorithms include Faster Region-based CNN (R-CNN), Mask R-CNN, RatinaNet model, YOLO model series, or combinations thereof.

The computing device of the present disclosure can include various types of computer readable storage mediums. For instance, in some embodiments, the computer readable storage mediums can be a tangible device that can retain and store instructions for use by an instruction execution device. In some embodiments, the computer readable storage medium may include, without limitation, an electronic storage device, a magnetic storage device, an optical storage device, an electromagnetic storage device, a semiconductor storage device, or combinations thereof. A non-exhaustive list of more specific examples of suitable computer readable storage medium includes, without limitation, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, or combinations thereof.

A computer readable storage medium, as used herein, is not to be construed as being transitory signals per se. Such transitory signals may be represented by radio waves or other freely propagating electromagnetic waves, electromagnetic waves propagating through a waveguide or other transmission media (e.g., light pulses passing through a fiber-optic cable), or electrical signals transmitted through a wire.

In some embodiments, computer readable program instructions described herein can be downloaded to respective computing/processing devices from a computer readable storage medium or to an external computer or external storage device via a network, such as the Internet, a local area network, a wide area network and/or a wireless network. In some embodiments, the network may include copper transmission cables, optical transmission fibers, wireless transmission, routers, firewalls, switches, gateway computers and/or edge servers. In some embodiments, a network adapter card or network interface in each computing/processing device receives computer readable program instructions from the network and forwards the computer readable program instructions for storage in a computer readable storage medium within the respective computing/processing device.

In some embodiments, computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, the computer readable program instructions may execute entirely on the user's computer, partly on the user's computer, as a stand-alone software package, partly on the user's computer and partly on a remote computer or entirely on the remote computer or server. In the latter scenario, the remote computer may be connected in some embodiments to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present disclosure.

Figure 1B:
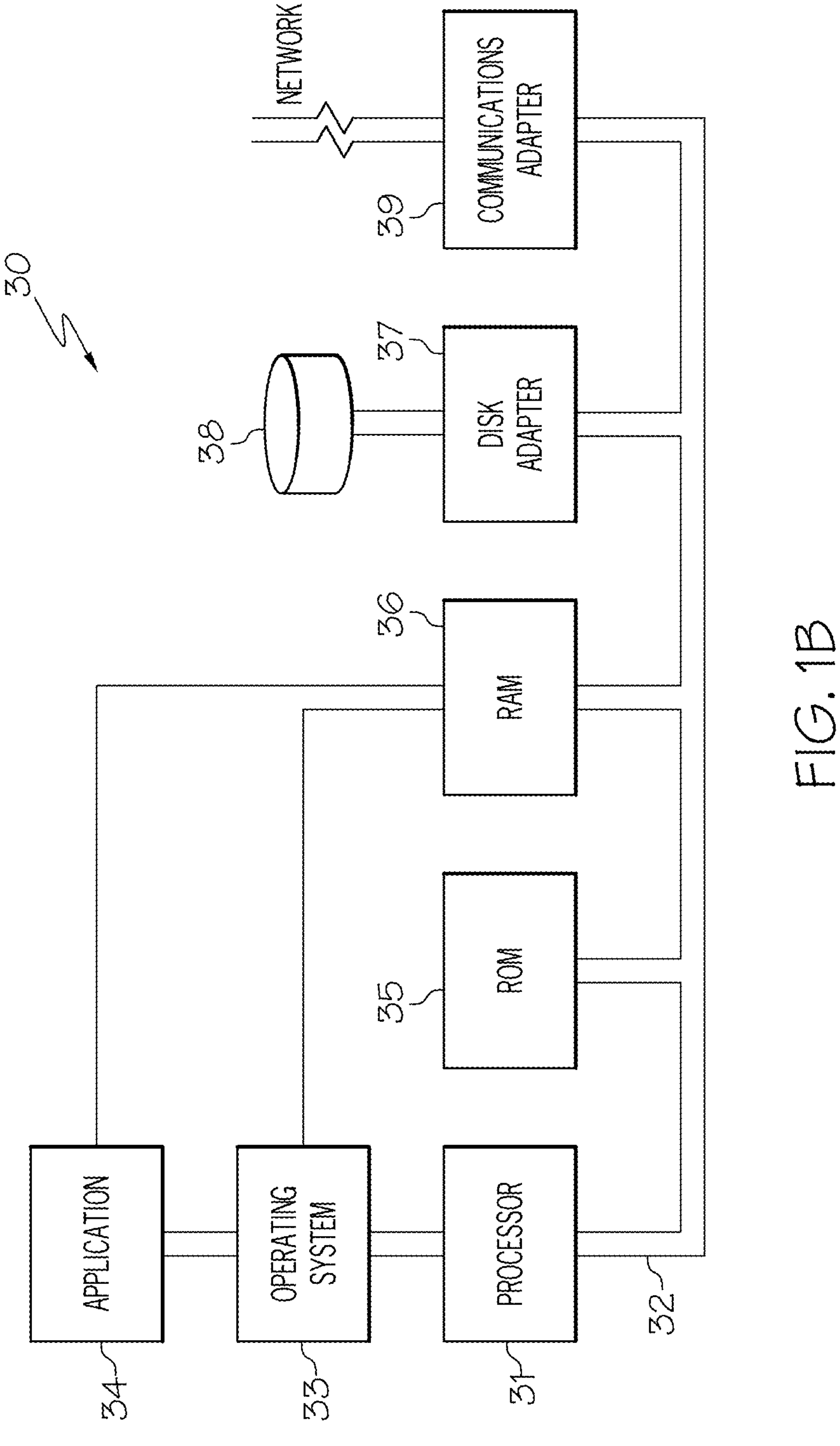
FIG. 1B illustrates a schematic of a computing device for automated identification of air voids on a surface.

Embodiments of the present disclosure for identifying air voids of a surface as discussed herein may be implemented using a computing device illustrated in FIG. 1B. Referring now to FIG. 1B, FIG. 1B illustrates an embodiment of the present disclosure of the hardware configuration of a computing device 30 which is representative of a hardware environment for practicing various embodiments of the present disclosure. Computing device 30 has a processor 31 connected to various other components by system bus 32. An operating system 33 runs on processor 31 and provides control and coordinates the functions of the various components of FIG. 1B. An application 34 in accordance with the principles of the present disclosure runs in conjunction with operating system 33 and provides calls to operating system 33, where the calls implement the various functions or services to be performed by application 34. Application 34 may include, for example, a program for identifying air voids of a surface, as discussed in the present disclosure, such as in connection with FIGS. 2A-2B, 3A-3B, 4-5, 6A-6F, 7A-7B, 8, 9A-9B, 10A-10G, and 11A-11E.

Referring again to FIG. 1B, read-only memory ("ROM") 35 is connected to system bus 32 and includes a basic input/output system ("BIOS") that controls certain basic functions of computing device 30. Random access memory ("RAM") 36 and disk adapter 37 are also connected to system bus 32. It should be noted that software components including operating system 33 and application 34 may be loaded into RAM 36, which may be computing device's 30 main memory for execution. Disk adapter 37 may be an integrated drive electronics ("IDE") adapter that communicates with a disk unit 38 (e.g., a disk drive). It is noted that the program for identifying air voids of a surface, as discussed in the present disclosure, such as in connection with FIGS. 2A-2B, 3A-3B, 4-5, 6A-6F, 7A-7B, 8, 9A-9B, 10A-10G, and 11A-11E, may reside in disk unit 38 or in application 34.

Computing device 30 may further include a communications adapter 39 connected to bus 32. Communications adapter 39 interconnects bus 32 with an outside network (e.g., wide area network) to communicate with other devices.

Aspects of the present invention are described herein with reference to flowchart illustrations and/or block diagrams of methods, apparatus (systems), and computing devices according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Systems for Automated Identification of Air Voids

With reference to FIGS. 2A-2B for illustrative purposes, additional embodiments of the present disclosure pertain to a system 40 for automated identification of air voids on a surface 42. System 40 generally includes a hardware system that includes: a camera 44 operable to capture a plurality of images of surface 42 at different light directions, a plurality of lights 46 operable to sequentially illuminate surface 42 at different light directions during the capture of the plurality of images, and a processor operable to reconstruct the received images into a three-dimensional representation of surface 42.

The system of the present disclosure also includes a software system in electrical communication with the hardware system. The software system includes an algorithm specifically trained for air void identification. In some embodiments, the algorithm is operational to receive the reconstructed three-dimensional representation of the plurality of images from the hardware system to identify the air voids.

In some embodiments, system 40 also includes a graphical user interface 48 in electrical communication with the algorithm. In some embodiments, the graphical user interface is operable to display the resulting air void identification.

In some embodiments, system 40 may also include bracket 54 for anchoring camera 44 and lights 46. In some embodiments, system 40 may also include base 56 for stabilizing surface 42.

The system of the present disclosure may be operated in various manners. For instance, in some embodiments, surface 42 may be placed on base 56. Thereafter, camera 44 may capture a plurality of images of surface 42 at different light directions while the plurality of lights 46 sequentially illuminate the surface at different light directions during image capture. Thereafter, a processor reconstructs the received images into a three-dimensional representation of the surface. Next, an algorithm for air void identification that is in electrical communication with the hardware system receives the reconstructed three-dimensional representation of the surface to identify the air voids of the surface. The results may then be displayed on graphical user interface 48.

The system of the present disclosure may include various types of cameras. For instance, in some embodiments, the camera includes a high-resolution charge coupled device (CCD) camera.

The system of the present disclosure may also include various types of lights. For instance, in some embodiments, the plurality of lights include light emitting diodes (LEDs).

Additionally, the system of the present disclosure may include various types of hardware. Suitable hardware were described supra and are incorporated herein by reference. For instance, in some embodiments, the hardware includes a hardware system 30 described in FIG. 1B.

The system of the present disclosure may also include various algorithms. Suitable algorithms were described supra and are incorporated herein by reference. For instance, in some embodiments, the algorithm is a machine learning algorithm. In some embodiments, the machine learning algorithm is trained to distinguish between air voids and non-air voids on the surface. In some embodiments, the machine learning algorithm include Convolutional Neural Network (CNN) algorithms. In some embodiments, according to the final output of the machine-learning algorithms, the CNN can be subdivided into image segmentation algorithms and object detection algorithms. In some embodiments, the image segmentation CNN algorithms include Unet model, Unet+ model, Unet++ model, DeepLab model series, or combinations thereof. In some embodiments, the object detection CNN algorithms include Faster Region-based CNN (R-CNN), Mask R-CNN, RatinaNet model, YOLO model series, or combinations thereof.

Applications and Advantages

In some embodiments, the methods, computing devices and systems of the present disclosure provide fully automated, accurate, low cost, and highly efficient modes of identifying air voids from various surfaces. For instance, in some embodiments, the methods, computing devices and systems of the present disclosure can reduce the time of air-void analysis of a surface from several hours (e.g., seven hours) to several minutes (e.g., 1-2 minutes).

Moreover, unlike prior systems, the methods, computing devices and systems of the present disclosure do not require contrast enhancement of a surface as a pre-requisite to air-void analysis. Contrast enhancement of a surface is a manual process that includes multiple time-consuming steps, such as 1) blackening a hardened surface using a black marker pen; 2) whitening the air voids in surfaces using a white powder; and 3) manually eliminating the non-air-void defects in surfaces that are filled by white powder using a sharp black marker pen. As such, the methods, computing devices and systems of the present disclosure greatly facilitate air-void analysis of a system without requiring substantial time or technical expertise.

Accordingly, the methods, computing devices and systems of the present disclosure can have numerous applications. For instance, in some embodiments, the methods, computing devices and systems of the present disclosure can be utilized for automated air void identification of various concrete surfaces. In fact, Applicant is unaware of any prior air-void analysis systems that can identify air voids in hardened concrete surfaces automatically.

Additional Embodiments

Reference will now be made to more specific embodiments of the present disclosure and experimental results that provide support for such embodiments. However, Applicants note that the disclosure herein is for illustrative purposes only and is not intended to limit the scope of the claimed subject matter in any way.

Example 1. Automated Air-Void Detection Method for Hardened Cement Concrete Using Three-Dimensional Reconstruction and Artificial Intelligence Techniques This Example demonstrates the development of an automated air-void detection method for hardened cement concrete using three-dimensional reconstruction and artificial intelligence techniques.

Example 1.1. Three-Dimensional Reconstruction Hardware System

The hardware system of the automated air-void segmentation system is shown in FIGS. 2A-2B. A laptop, which contains all the required programs, is used to store image data and process the air-void segmentation work. A Sony α 7R II camera with a fixed-focus lens is used to capture the images of concrete specimens. The camera is located above the specimen and fixed by a tripod. The spatial resolution, which represents the actual area on a sample surface mapped by one pixel, is a key parameter for the camera system. The maximum magnification ratio represents the maximum ratio of the CMOS (Complementary Metal Oxide Semiconductor) sensor size and the captured object size. Both CMOS sensor size and the maximum magnification ratio decide the size of the smallest air voids that can be captured by the camera.

In this Example, the distance between camera's CMOS sensor and sample surface is set to 18 cm, which is slightly larger than the smallest focus distance of the lens. A concrete surface area of the size of 4.5 cm×3.1 cm is captured. In this way, the camera can take a high-resolution image of 5.66 μm/pixel which can capture air voids with a minimum diameter of 10 μm and avoid shadow caused by the camera lens. The specifications for both the camera and the lenses are listed in Table 1.

TABLE 1

Technical Specifications of Sony α 7R II CCD Camera and Sony FE 50 mm F2.8 Macro Lenses.

| | Technical specifications | Value |
|---|---|---|
| Camera | Resolution | 42.2 megapixel |
| | CMOS sensor | 35.9 mm *24.0 mm |
| | Spatial resolution | 5.66 μm |
| Lenses | Focal length | 20 cm |
| | Smallest focus distance | 16 cm |
| | Maximum magnification ratio | 1 |
| | Aperture | f/2.8 |
| | Shutter time | 1/16 |
| | ISO | 100 |

The six LED (Light Emitting Diode) lights are from Smart Vision Lights Inc. and the model is LM75. This LED light can provide a wide-angle uniform light projection, and can simulate the parallel light emitted from a point light source at an infinite distance. The six LED lights are fixed in a 16 cm diameter circle with equal intervals and the tilt angle of each LED light is 45° which is shown in FIG. 2B.

The LED light manager is used to control the six LED lights to light in turn and a total of six concrete surface images are captured for each concrete sub-specimen. The power supply which can provide a maximum of 24 V and 17 A output is selected as power input for the 3D reconstruction hardware system. The size of the experiment bracket is 40 cm×40 cm×20 cm. To minimize the uncertain disturbance caused by ambient light, the whole system needs to be used in dark environments or covered by shade cloth when in use.

Example 1.2. Three-Dimensional Cement Reconstruction Using a Photometric Stereo Method Various photometric stereo methods were compared for the extraction of three-dimensional (3D) air-void information from cement. A conventional photometric stereo method that was proposed by Woodham (Woodham's photometric stereo method) outperformed the other photometric stereo methods and could extract the gradient of air voids from cement. The Woodham's photometric stereo method, which is shown in Equation 1, utilizes the relationship between incoming lighting direction LL∈ $\mathcal{R}$ kk×3, surface normal NN∈ $\mathcal{R}$ 3×1, and observed intensity II∈ $\mathcal{R}$ kk×1 to compute for the surface normal of each pixel.

$$\begin{bmatrix} i_1 \\ i_2 \\ \vdots \\ i_k \end{bmatrix} = \begin{bmatrix} L_1 \\ L_2 \\ \vdots \\ L_k \end{bmatrix} \cdot \begin{bmatrix} n_x \\ n_y \\ n_z \end{bmatrix} \tag{1}$$

kk∈ $\mathcal{R}$ is the number of lighting directions. In this Example, a photometric stereo system with 6 LED lights, as shown in FIGS. 2A-2B, is used for 3D reconstruction. A Sony CCD (Charge-Coupled Device) camera with a resolution of 42 megapixels is adopted for concrete surface image capturing. The system can achieve a resolution of 5.6 μm/pixel for concrete images.

A diagram of an estimated surface normal vector on hardened concrete surface is shown in FIGS. 3A and 3B. The components nx, ny, and nz in the computed surface normal vector are then normalized to (−1, 1) scale, whereas the 8-bit dynamic range is generally used for RGB (Red Green Blue) channels of images and the intensity of pixels in each channel is between 0 to 255. To ensure the surface normal compatible with the dynamic range of RGB images, the nx, ny, and nz of each pixel are mapped from (−1, 1) to (0, 255). An example of the mapping process with a 4 pixels×4 pixels image is shown in FIG. 4. For example, nx11, ny11, and nz11 are the components of the surface normal at pixel (1,1) on x, y, and z directions. The r11, g11, and b11, which are mapped by nx11, ny11, and nz11, are the pixel intensity of the pixel (1,1) in red, blue, and green channels, respectively.

Example 1.3. Air-Void Segmentation Using Artificial Intelligence

The conventional image segmentation methods can be considered as human-driven approaches. The design and selection of feature descriptors, which are determined by engineer's judgment with a long trial and error process, are critical for the successful addressing of specific image segmentation problems.

Recently, AI (Artificial Intelligence) has achieved great success in solving image segmentation problems with a higher accuracy and automation level. As a subset of AI-based image segmentation methods, the CNNs (Convolution Neural Networks) can learn feature extraction and classification automatically from image datasets using a 'forward prediction and backward learning' procedure. U-Net, which is a variant of FCN (Fully Convolutional Network) and improved with skipped connections, is adopted for air-void segmentation in this Example.

As shown in FIG. 5, the U-Net consists of an encoder structure and a decoder structure. Skip connections between the encoder and decoder combine lower-level features with higher-level features. The combined features can improve pixel-level localization. The U-Net architecture has been validated to be powerful for image segmentation. U-Net is currently one of the most used algorithms in biomedical image segmentation and has been successfully extended to the other semantic segmentation tasks in many other fields. In addition, the U-Net model can generate a comparable result using a small dataset. The algorithm was coded and implemented with TensorFlow, an open-source deep learning library in Python. The training processes were conducted on GPUs (Graphics Processing Units) for deep learning purposes. One NVIDIA® Tesla® V100 GPU with 16 GB of RAM was utilized.

Example 1.4. Hardened Concrete Samples

Considering the fact that the appearance of the concrete specimens can affect image segmentation results, the concrete specimens with various aggregate types and cement types were selected as experimental specimens. All the selected concrete specimens were drilled and sampled from an in-service concrete pavement structure. The details of the experimental specimens are described in Table 2.

TABLE 2

Description of experimental specimens

| Specimen No. | Total scan | Description of material constituents: Coarse aggregate | Fine aggregate |
|---|---|---|---|
| 1 | 3 (train) 1 (test) | Limestone | Quartz, limestone, chert, granite and feldspar |
| 2 | 2 (train) 1 (test) | Limestone | Manufactured sand, quartz, feldspar and chert |
| 3 | 1 (train) 1 (test) | Limestone, quartz and chert | Quartz, limestone, sandstone, igneous and siliceous |
| 4 | 3 (train) 1 (test) | Limestone, siliceous, igneous chert and quartzite | Limestone, siliceous, igneous chert, and quartzite |
| 5 | 3 (train) 1 (test) | Sandstone, limestone and igneous | Quartz, limestone, sandstone, igneous, and siliceous |

The specimen surfaces were polished according to the specifications in ASTM C457. To fit the field-of-view of the photometric stereo system, the original samples were sub-sliced into 4 cm×5 cm small pieces and a region of 3 cm×4.5 cm was captured as the field-of-view. Consequently, a total of 12 pieces of sliced concrete samples were utilized for the image processing and deep-learning training purpose. For each category of the hardened concrete samples, one slice was utilized for testing purposes. There were a total of 5 pieces of sliced concrete samples utilized for the testing purpose.

Example 1.5. Concrete Surface Image Capturing

The 3D reconstruction of hardened concrete surface requires at least three images captured under various illumination directions with a fixed field-of-view. Applicant's product uses six LED lights, which were lighted up in sequence, to simulate the illuminations from different directions. After each illumination, the camera automatically took a picture of a concrete surface. There were six pictures captured by the camera during each sequence. The parameters of the camera, such as aperture, ISO, and shutter time, were fixed during the experimental process. FIGS. 6A-6F present the six images captured for one concrete sample.

Example 1.6. Image Annotation and Registration

The CNNs learn feature extraction and classification using a 'forward prediction and backward learning' procedure. Consequently, for the model training purpose, each image needs a label to indicate the air-void regions and non-air-void regions. The labels of training data were first annotated using a contrast-enhancement method, and then manually refined. Acrylic ink and a rubber brayer were adopted to blacken the polished concrete surfaces. The applied acrylic ink could generate a thin dark layer without filling out air voids. In case some aggregates cannot be ideally painted, the missed regions were carefully re-painted by a marker pen. The specimens were then left to air dry at room temperature for 30 minutes. After the ink was dried thoroughly, a barium sulfate powder with an average particle size of 3 μm was used to highlight the air voids into white color. The barium sulfate powders were scattered on the hardened concrete surface and then pressed into air voids using hand fingers. The excess powders were removed with the edge of a silicone spatula. The images of the contrast enhanced concrete surface were captured using the photometric stereo system that is shown in FIGS. 2A-2B. All six LED lights were lighted to generate a uniform illumination on the concrete surfaces.

Finally, an image-processing software (ImageJ) was used to segment the air voids from the enhanced concrete images by setting a gray value threshold. The Otsu method was utilized to provide an optimal threshold. In the case when the Otsu method did not generate an ideal threshold, the generated threshold may be manually adjusted. The non-air-void regions in the concrete images such as cracks, voids in aggregates and the region with residual barium sulfate powder were double-checked and removed by the rater using Adobe Photoshop.

The contrast enhancement process was only used for data annotation. During the 3D reconstruction and image segmentation process, no contrast enhancement is required for concrete samples.

The raw concrete images and the enhanced concrete images were captured in two different scans in sequence. The hardened concrete surface was first scanned using the 3D reconstruction system to obtain the 3D surface normal image of the hardened concrete surface. The concrete specimen was then taken away from the testbed of the 3D reconstruction system for contrast-enhancement procedure. After the enhancement procedure, the concrete sample was relocated to the testbed and scanned to capture the contrast-enhanced image. Even though careful locating was exercised to ensure the hardened concrete was aligned to the same position as the first scan, slight displacements were still observed between the two scans.

The CNNs require accurate annotations, and the labels and image features are expected to correspond at pixel level. Therefore, the images of the two scans were manually adjusted using Adobe Photoshop to match up at each pixel in the two scans. An example of a hardened concrete image and its annotated air-void image is shown in FIGS. 7A-7B, respectively.

Example 1.7. Training Dataset Preparation

There are 1,941,105 trainable parameters incorporated in the U-Net model. A well-prepared image dataset including both air-void images and annotations is required to train the U-Net model. Consequently, the concrete surface normal images and its corresponding air-void annotations were randomly cropped into 256 pixels×256 pixels small pieces and 10,200 cropped images were generated. Then, 80% of the crops were adopted as training data and 20% of the crops were adopted as validation data. During the training process, cross-entropy was selected as the loss factor to evaluate the discrepancy between the training results and labels after each epoch. The Adam optimizer was adopted for updating the weights in U-Net. A flow chart that includes the major works of training the U-Net model is shown in FIG. 8.

Example 1.8. Accuracy Measurement

To evaluate the developed air-void segmentation system, a 100×100 dot matrix was generated and appended to both the segmented images and the raw concrete images. The pixels in the raw concrete images that are corresponding to the appended dot-matrix were manually observed by an experienced petrographer. According to the observation, the dots in the dot matrix were labeled as air voids and non-air voids. The dots in the dot matrixes that were appended to the segmented images were also labeled by identifying the color of the corresponding pixel in the segmented images. The dot that was appended to a white pixel was labeled as air voids. The dot that was appended to a black pixel was labeled as non-air voids. The labeling process for the segmented images was done automatically using a program coded in Python. Consequently, accuracy measurements including MIoU (Mean of Intersection over Union), P (precision), R (Recall), and F1, which can be calculated by Equations 2-7, were utilized to evaluate the accuracy of the segmentation results.

$$IoU_{air\ voids} = \frac{TP}{TP + FP + FN} \tag{2}$$

$$IoU_{non-air-voids} = \frac{TN}{TN + FN + FP} \tag{3}$$

$$MIoU = \frac{IoU_{air\ voids} + IoU_{non-air-voids}}{2} \tag{4}$$

$$P = \frac{TP}{TP + FP} \tag{5}$$

$$R = \frac{TP}{TP + FN} \tag{6}$$

$$F_1 = \frac{2TP}{2TP + FP + FN} \tag{7}$$

TTTT is the percentage of dots that are correctly segmented as air voids. TTTT is the percentage of dots that are correctly segmented as non-air-void. FFFF is the percentage of dots that are incorrectly segmented as air voids. FFFF is the percentage of dots that are incorrectly segmented as non-air-void.

Example 1.9. Three-Dimensional Reconstruction Results of a Photometric Stereo Method An example of the raw concrete surface and the mapped surface normal image is shown in FIGS. 9A and 9B, respectively. Compared with the original concrete surface image, the surface normal image increased the contrast in uneven areas. The areas with a slant surface normal can be distinguished by identifying the color changes on the surface normal map. The areas with uniform pale green are the solid phase (aggregates and paste). The round areas with large color variations in a circle are the air voids.

As shown in FIGS. 9A and 9B, the air voids in the mapped surface normal image present a clear pattern and can be easily identified by naked eyes. FIGS. 10A-10G present various appearances of air voids and air-void like noises on concrete surface normal images. As shown in FIGS. 10A-10G, the regions of some dark or transparent aggregates also present a variation of color. The photometric stereo method estimates the surface normal of a target object by the intensity of reflected light. Under various lighting directions, a slant surface presents a great intensity variation, while a flat surface generates an identical surface intensity. The dark aggregates were apt to produce specularities under a specific lighting angle and thus lead to a biased slant surface normal estimation.

For the transparent aggregates, the lights are transmitted down to the bottom of the aggregates and reflected by the paste. Biased slant surface normal estimations were produced by the transparent aggregates. Consequently, the photometric stereo method inaccurately estimates the normal information in the region within some transparent aggregates and dark aggregates. The biased estimation generated air-void like appearances in the surface normal map. The similarity made the automated identification of air voids in hardened concrete a challenge. In addition, the air voids are not the only 'hollows' in concrete surfaces. The voids and cracks in aggregates are another kind of 'hollows' in concrete surfaces that can be mistaken as air voids.

The air voids with different sizes and depths presented different appearances. Inside some deep air voids, a 'flat region' can be observed. The 'flat regions' were caused by occlusions. The lights were blocked by the edge of air voids and did not reach the bottom of the air voids. Thus, the photometric stereo system failed to capture the information at the bottom of the air voids. The system assumed those regions as a flat plane because there was no intensity variation captured in the blocked regions. On the other hand, in shallow air voids, the color variation was too little and sometimes can be mistaken as non-air-void regions.

Example 1.10. Air-Void Segmentation Results of U-Net Model

The segmented concrete images are presented in FIGS. 11A-11E. In the raw segmentation results, the output value of a purple pixel is close to 0 and the output value of a yellow pixel is close to 1. The segmented concrete images with the threshold of 0.1 are presented in the binary segmentation results of FIGS. 11A-11E. TP pixels are marked in white color, TN pixels are marked in black color, FN pixels are marked in blue color, and FP pixels are marked in red color. As discussed previously, many air-void like noises can be generated in surface normal images using photometric stereo methods. The trained model correctly identified most of the biased regions and only a small percent of the biased regions was incorrectly identified as air voids. In addition, most of the voids and cracks in some aggregates were well identified as non-air voids. However, some well-rounded voids in aggregates were still incorrectly segmented as air voids. Also, some missing air voids were observed in the segmentation result. Most of the missing air voids were deep air voids. Those air voids generally can be easily identified using naked eyes, while these kinds of air voids presented a significantly different appearance in the surface normal map, which hinder the correct air-void image segmentation.

The accuracy measurements for the testing samples are presented in Table 3.

TABLE 3

Accuracy measurement for testing samples using U-Net.

| Specimen | FP | FN | TP | TN | P | R | F1 | $IoU_{air}$ void | $IoU_{non\text{-}air}$ void | MIoU |
|---|---|---|---|---|---|---|---|---|---|---|
| 1 | 0.008 | 0.115 | 0.885 | 0.992 | 0.991 | 0.885 | 0.935 | 0.878 | 0.890 | 0.884 |
| 2 | 0.003 | 0.014 | 0.986 | 0.997 | 0.997 | 0.986 | 0.991 | 0.983 | 0.983 | 0.983 |
| 3 | 0.019 | 0.092 | 0.908 | 0.981 | 0.980 | 0.908 | 0.943 | 0.892 | 0.899 | 0.895 |
| 4 | 0.006 | 0.073 | 0.927 | 0.994 | 0.994 | 0.927 | 0.959 | 0.922 | 0.927 | 0.924 |
| 5 | 0.006 | 0.115 | 0.885 | 0.994 | 0.993 | 0.885 | 0.936 | 0.879 | 0.891 | 0.885 |
| Average | 0.008 | 0.082 | 0.918 | 0.992 | 0.991 | 0.918 | 0.953 | 0.911 | 0.918 | 0.914 |

The testing samples were first scanned using the photometric stereo system and the surface normal images were then mapped from the estimated surface normal vectors. All the air-void segmentation results were output by the trained U-Net model based on the surface normal images. Equations 2-7 were adopted for calculating the accuracy indices. As shown in Table 3, the average of the MIoU of five testing samples is 0.914, which indicates that the proposed method could detect the air voids in hardened concrete surface with a relative good accuracy. The average FP is 0.008 and the average P is 0.991, which indicate that the proposed method could differentiate the air voids from most of the air-void like noises and only a small portion of air-void like noises was incorrectly identified as air voids. The average FN is 0.082 and is almost 10 times as great as FP. In addition, R is 0.918 which is nearly 0.1 less than P. Both FN and R indicate that the misidentification was the major source of segmentation errors.

The size of the minimum air void that can be segmented by U-Net is around 22 am (4-pixel length). Table 4 presents the measurement of air-void parameters using U-Net results and ground truth.

TABLE 4

Air-void Parameters Measured on U-Net results and Ground Truth using Point Count Method.

| | | Air content (%) | | Specific surface ($mm^{-1}$) | | Spacing factor (mm) | |
|---|---|---|---|---|---|---|---|
| | | Measurement value | Error (%) | Measurement value | Error (%) | Measurement value | Error (%) |
| 1 | U-Net | 1.64 | 6.49 | 13.152 | 25.75 | 0.288 | 25.32 |
| | Ground truth | 1.54 | | 10.459 | | 0.386 | |
| 2 | U-Net | 1.63 | 11.64 | 10.397 | 1.29 | 0.367 | 11.57 |
| | Ground truth | 1.46 | | 10.264 | | 0.415 | |
| 3 | U-Net | 4.08 | 2.77 | 17.644 | 10.16 | 0.086 | 11.67 |
| | Ground truth | 3.97 | | 16.016 | | 0.098 | |
| 4 | U-Net | 1.6 | 11.11 | 16.194 | 2.15 | 0.24 | 11.89 |
| | Ground truth | 1.44 | | 15.854 | | 0.272 | |
| 5 | U-Net | 1.32 | 7.32 | 15.491 | 7.45 | 0.304 | 0.68 |
| | Ground truth | 1.23 | | 16.738 | | 0.302 | |
| Average error (%) | | | 7.87 | | 9.36 | | 12.23 |

The air-void parameters are measured using the Procedure B Modified Point-Count Method. 27% is assumed as the measured paste content. As shown in Table 4, the average measurement errors of air content, specific surface, and spacing factor for the three hardened concrete specimens are 7.87%, 9.36% and 12.23%, respectively.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A computer-implemented method for automated identification of air voids on a surface, said method comprising:

receiving a plurality of images of the surface, wherein a plurality of lights sequentially illuminate the surface at different light directions during capturing of images, and wherein the plurality of images comprise images that are each captured under a different lighting direction relative to the other images;

reconstructing the plurality of images into at least one three-dimensional representation of the surface; and feeding the reconstructed three-dimensional representation of the surface into an algorithm specifically trained for air void identification, wherein the algorithm identifies the air voids on the surface.

2. The method of claim 1, wherein the surface comprises a hardened concrete surface.

3. The method of claim 1, wherein the method occurs without modifying the contrasts of the plurality of images of the surface.

4. The method of claim 1, further comprising a step of capturing the plurality of images.

5. The method of claim 1, wherein the reconstructing of the images occurs by three-dimensional photometric reconstruction.

6. The method of claim 1, wherein the reconstructing of the images occurs through the use of a hardware system, wherein the hardware system comprises:

a camera operable to capture the plurality of images of the surface at different light directions, a plurality of lights operable to sequentially illuminate the surface at different light directions during the capture of the plurality of images, and a processor operable to reconstruct the received images into the three-dimensional representation.

7. The method of claim 1, wherein the algorithm is a machine learning algorithm, wherein the machine learning algorithm is trained to distinguish between air voids and non-air voids on the surface.

8. The method of claim 7, wherein the machine learning algorithm comprises a Convolutional Neural Network (CNN) algorithm.

9. The method of claim 1, wherein the identifying of the air voids comprises segmenting the air voids.

10. The method of claim 1, further comprising a step of displaying the resulting air void identification.

11. The method of claim 1, further comprising a step of utilizing the identification results to assess the quality of the surface.

12. The method of claim 11, wherein the quality of the surface comprises a freeze-thaw performance of the surface.

13. The method of claim 1, further comprising a step of utilizing the identification results to recommend a surface treatment decision, implement the surface treatment decision, or combinations thereof.

14. A computing device for automated identification of air voids on a surface, wherein the computing device comprises one or more computer readable storage mediums having a program code embodied therewith, wherein the computing device comprises a processor operable to execute the program code, and wherein the program code comprises programming instructions for:

receiving a plurality of images of the surface, wherein a plurality of lights sequentially illuminate the surface at different light directions during capturing of images, and wherein the plurality of images comprise images that are each captured under a different lighting direction relative to the other images;

reconstructing the received images into at least one three-dimensional representation of the surface; and feeding the reconstructed three-dimensional representation of the surface into an algorithm specifically trained for air void identification, wherein the algorithm identifies the air voids.

15. The computing device of claim 14, wherein the computing device is in electrical communication with a hardware system operable to reconstruct the image, wherein the hardware system comprises:

a camera operable to capture the plurality of images of the surface at different light directions, a plurality of lights operable to sequentially illuminate the surface at different light directions during the capture of the plurality of images, and a processor operable to reconstruct the received images into the three-dimensional representation.

16. The computing device of claim 14, wherein the computing device further comprises programming instructions for utilizing the identification results to assess the quality of the surface.

17. The computing device of claim 14, wherein the computing device further comprises programming instructions for recommending a surface treatment decision, implementing the surface treatment decision, or combinations thereof.

18. The computing device of claim 14, wherein the computing device further comprises programming instructions for capturing the plurality of images.

19. The computing device of claim 14, wherein the programing instructions for reconstructing of the images comprises programing instructions for three-dimensional photometric reconstruction.

20. The computing device of claim 14, wherein the algorithm is a machine learning algorithm, wherein the machine learning algorithm is trained to distinguish between air voids and non-air voids on the surface.

21. The computing device of claim 20, wherein the machine learning algorithm comprises a Convolutional Neural Network (CNN) algorithm.

22. A system for automated identification of air voids on a surface, wherein the system comprises:

a hardware system comprising:

a camera operable to capture a plurality of images of the surface, wherein the plurality of images comprise images that are each captured under a different lighting direction relative to the other images, a plurality of lights operable to sequentially illuminate the surface at different light directions during the capture of the plurality of images such that the plurality of images comprise images that are each captured under a different lighting direction relative to the other images, and a processor operable to reconstruct the received images into a three-dimensional representation of the surface; and a software system in electrical communication with the hardware system, wherein the software system comprises an algorithm specifically trained for air void identification, wherein the algorithm is operational to receive the reconstructed three-dimensional representation of the plurality of images from the hardware system and identify the air voids.

23. The system of 22, further comprising a graphical user interface in electrical communication with the algorithm, wherein the graphical user interface is operable to display the resulting air void identification.

24. The system of 22, wherein the algorithm is a machine learning algorithm, wherein the machine learning algorithm is trained to distinguish between air voids and non-air voids on the surface.

* * * * *